United States Patent
Sumi et al.

(10) Patent No.: US 7,206,013 B2
(45) Date of Patent: Apr. 17, 2007

(54) IMAGE RECORDING APPARATUS, IMAGE FORMING METHOD, AND IMAGE FORMING APPARATUS

(75) Inventors: Katsuto Sumi, Kanagawa (JP); Akiko Ohno, Kanagawa (JP); Daisuke Nakaya, Kanagawa (JP); Yoshinori Katoh, Kanagawa (JP); Atsuko Shimizu, Kanagawa (JP); Hiroshi Matsuoka, Kanagawa (JP); Takayuki Uemura, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 60 days.

(21) Appl. No.: 10/685,649

(22) Filed: Oct. 16, 2003

(65) Prior Publication Data

US 2004/0085437 A1 May 6, 2004

(30) Foreign Application Priority Data

| Oct. 16, 2002 | (JP) | ............................. 2002-301951 |
| Mar. 6, 2003 | (JP) | ............................. 2003-059537 |
| Mar. 6, 2003 | (JP) | ............................. 2003-059717 |
| Mar. 25, 2003 | (JP) | ............................. 2003-083624 |

(51) Int. Cl.
  *B41J 2/435* (2006.01)
(52) U.S. Cl. ....................... 347/236; 347/246
(58) Field of Classification Search ........ 347/234–237, 347/239, 246–250, 261, 252–255; 427/596
  See application file for complete search history.

(56) References Cited

U.S. PATENT DOCUMENTS

| 3,787,888 A | * | 1/1974 | Haskal ........................ 347/246 |
| 5,352,495 A | * | 10/1994 | Henderson et al. ......... 427/596 |
| 6,121,993 A | * | 9/2000 | Maekawara et al. ........ 347/236 |
| 6,208,371 B1 | * | 3/2001 | Miyagawa et al. ......... 347/261 |
| 6,388,689 B1 | | 5/2002 | Toda et al. |

FOREIGN PATENT DOCUMENTS

| JP | 8-23422 A | 1/1996 |
| JP | 2001-96794 A | 4/2001 |

* cited by examiner

*Primary Examiner*—Hai Pham
(74) *Attorney, Agent, or Firm*—Sughrue Mion, PLLC

(57) ABSTRACT

The image recording apparatus scans a heat mode recording material with a light beam modulated in accordance with image information, to thereby record an image on the heat mode recording material. The apparatus includes an unit for generating a modulated signal, an unit for generating an additional signal at a timing of at least one of rising and falling of the modulated signal and a unit for generating a drive signal by adding the additional signal to the modulated. The image forming method and apparatus scan a photosensitive material with the light beam to record an image, and a power of the light beam is set to a power of a level at which a recording line width or a recording dot size, which is determined depending upon a threshold value for the photosensitive material to blacken, is substantially fixed even if defocus occurs.

33 Claims, 16 Drawing Sheets

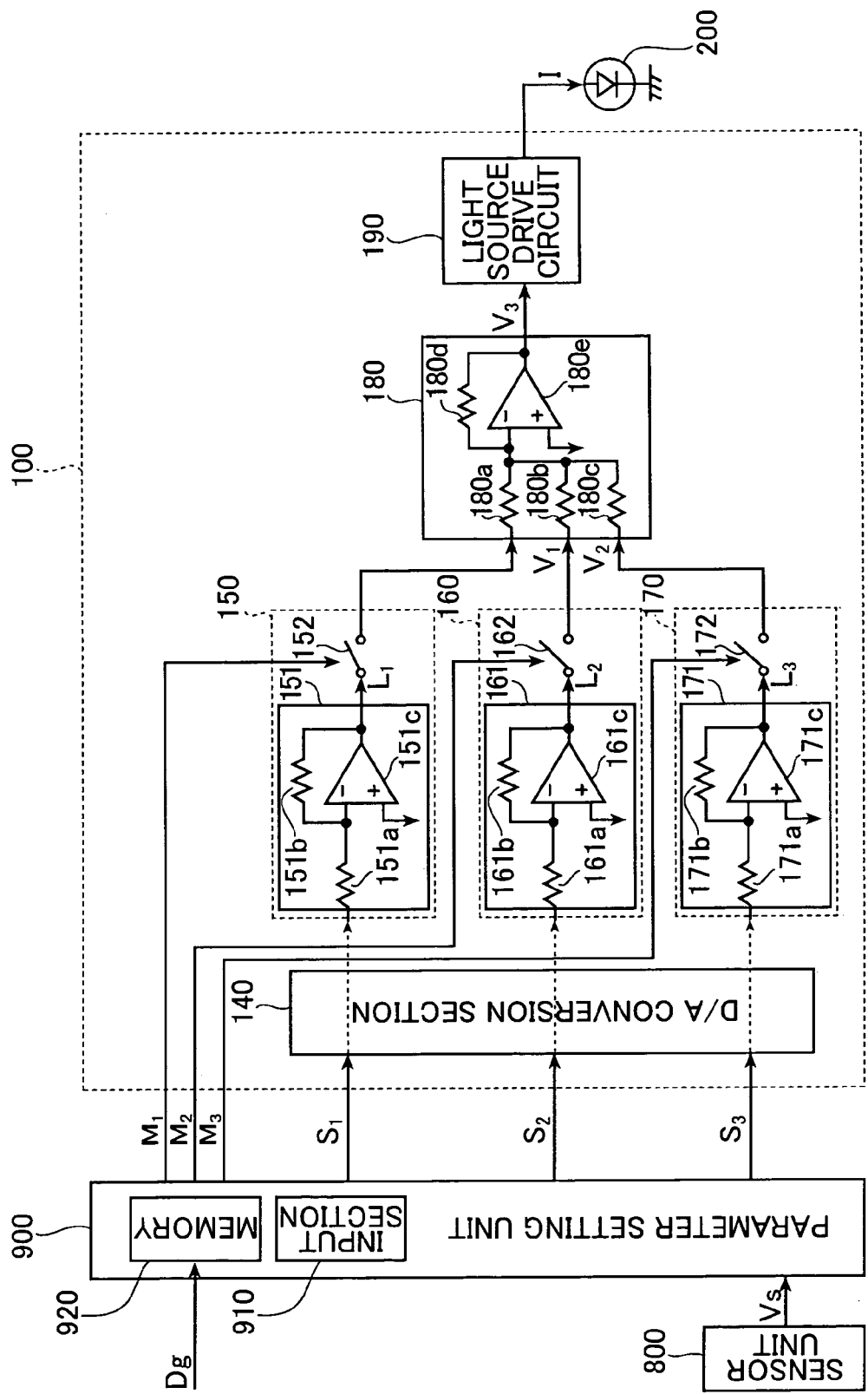

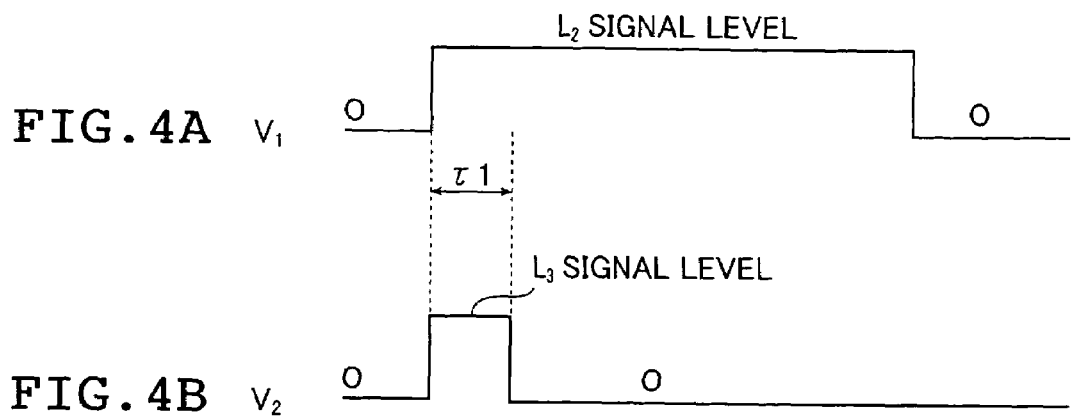
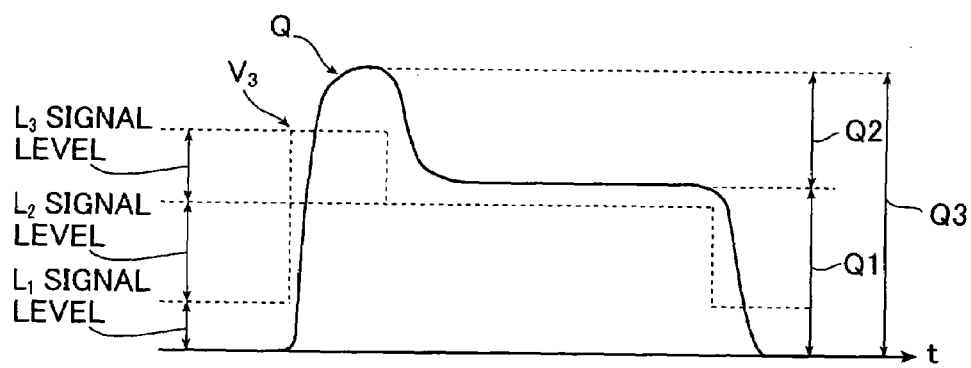
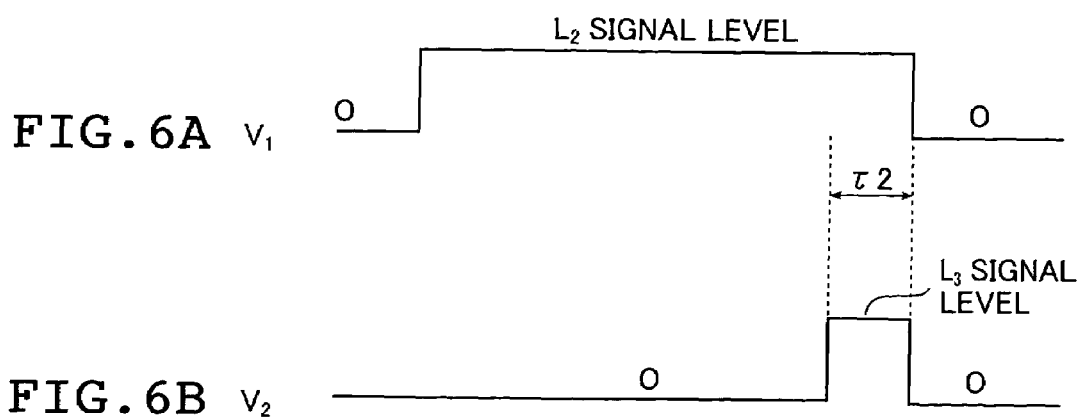

FIG. 7
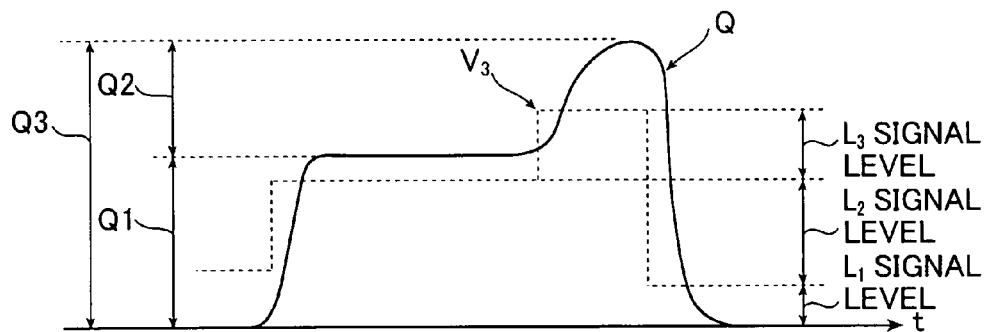
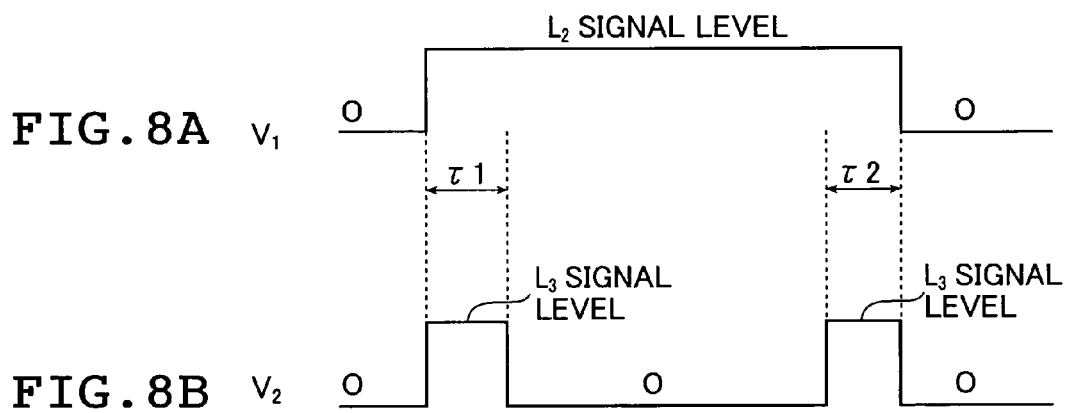
FIG. 9
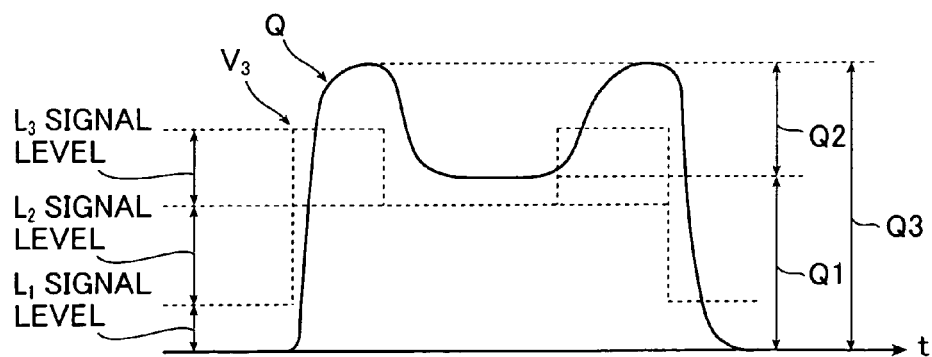

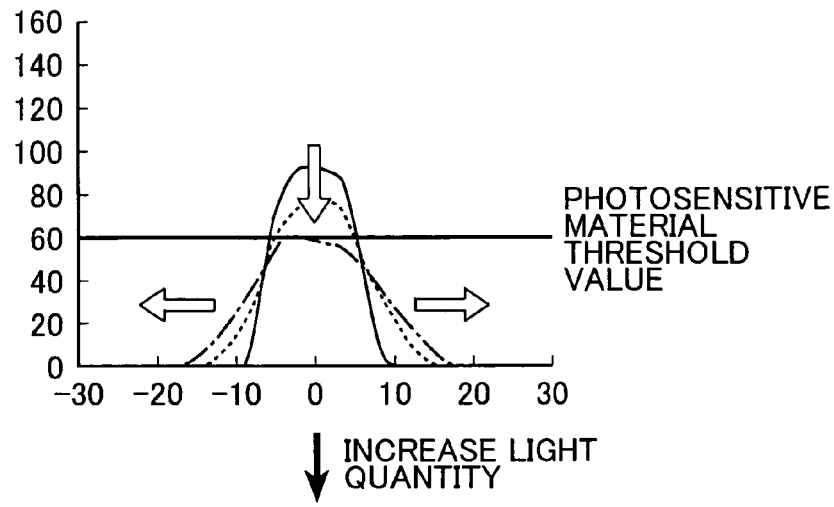
FIG.12A
FIG.12B
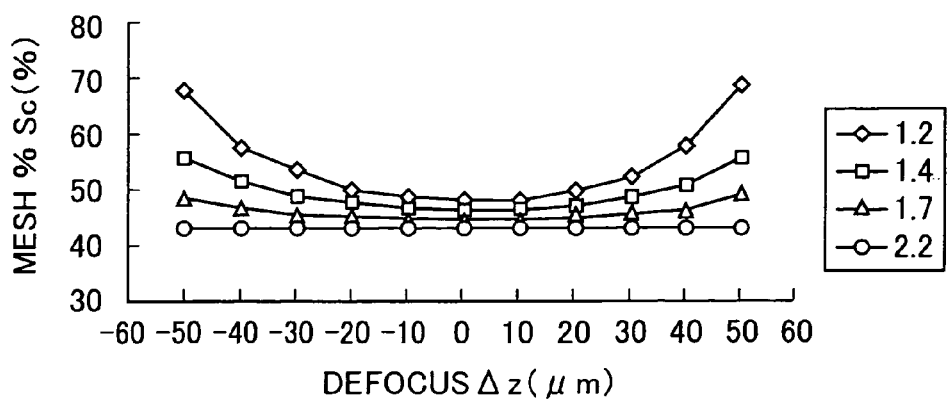
FIG.13

FIG. 23

| | FACTORS OF FLUCTUATION IN SENSITIVITY | (DETECTION MEANS) | CORRECTION MEANS (CONTROL TARGET) |
|---|---|---|---|
| PHOTO-SENSITIVE MATERIAL | · LOT FLUCTUATION IN SENSITIVITY<br>· CHANGE OVER TIME OF SENSITIVITY<br>· TEMPERATURE AND HUMIDITY DEPENDENCY OF SENSITIVITY | (DENSITY METER FOR MEASURING DENSITY AFTER EXPOSURE DEVELOPMENT)<br>(DENSITY METER FOR MEASURING DENSITY AFTER EXPOSURE DEVELOPMENT)<br>(TEMPERATURE DETECTOR FOR DETECTING TEMPERATURE AT THE TIME OF EXPOSURE) | |
| EXPOSURE MACHINE | · TEMPERATURE DEPENDENCY OF LIGHT QUANTITY DETECTOR | (EXPOSURE SECTION TEMPERATURE DETECTOR) | · NON-EDGE PART POWER<br>· EDGE PART POWER<br>· EDGE PART LENGTH<br>· IMAGE RECORDING TIME |
| AUTO-MATIC DEVELOP-MENT MACHINE | · FLUCTUATION IN LIQUID ACTIVITY<br>┌ ELECTRIC CONDUCTIVITY/ pH/LIQUID CONCENTRATION<br>├ LIQUID TEMPERATURE<br>├ ELAPSED TIME AFTER PREPARATION OF NEW LIQUID<br>└ PROCESSING AMOUNT AFTER PREPARATION OF NEW LIQUID<br>　┌ NUMBER OF TREATED SHEETS<br>　└ TREATED AREA<br>· FLUCTUATION IN DEVELOPMENT PROCESSING TIME | (ELECTRIC CONDUCTIVITY DETECTOR/pH DETECTOR/ ANALYSIS OF COMPONENTS)<br>(TEMPERATURE DETECTOR)<br>(METER FOR MEASURING ELAPSED TIME AFTER PREPARATION OF NEW LIQUID)<br>—<br>(COEFFICIENT MULTIPLIER)<br>(PLATE WIDTH DETECTOR, PLATE PASSAGE TIME DETECTOR)<br>(CONVEYANCE SPEED DETECTOR) | · ELECTRIC CONDUCTIVITY (REPLENISHMENT OF LIQUID/ WATER)/pH (REPLENISHMENT OF LIQUID/WATER)/LIQUID CONCENTRATION(REPLENISH-MENT OF COMPONENTS)<br>· LIQUID TEMPERATURE<br><br><br><br><br><br>· DEVELOPMENT TIME (CONVEYANCE SPEED) |

IMAGE RECORDING APPARATUS, IMAGE FORMING METHOD, AND IMAGE FORMING APPARATUS

BACKGROUND OF THE INVENTION

Field of the Invention

The present invention relates to an image recording apparatus for recording an image on a photosensitive material such as a heat mode recording material using a light beam, and an image forming method and an image forming apparatus for forming an image. More specifically, the present invention relates to an image recording apparatus which scans a photosensitive material such as a heat mode recording material with a light beam, which is modulated according to image information, and records an image on the photosensitive material, and an image forming method and an image forming apparatus which enable stable image quality to be maintained even in the case in which defocus of the light beam due to various causes or fluctuation in sensitivity due to the photosensitive material or a processing system therefor occurs.

In recent years, as the computer technology develops, the CTP (Computer to Plate), that is, a technique for recording an image directly on a printing plate material having sensitivity (hereinafter referred to as photosensitive material) such as a photosensitive heat-sensitive material or a heat mode recording material without the intervention of a film upon plate making, has been established in the field of plate making technique as well.

In this technique, there is known an image recording apparatus for scanning a heat mode recording material for printing (thermal type printing plate) with a light beam, to thereby record an image thereon. In this image recording apparatus, flashing of a light beam emitted from a light source is controlled by a modulated signal which is generated on the basis of image information of an original picture to be recorded. The heat mode recording material is scanned with the light beam by moving the light source or the heat mode recording material, whereby an image can be recorded on the heat mode recording material.

Here, the modulated signal is a signal having two values consisting of a first signal level and a second signal level that is larger than the first signal level. The first signal level and the second signal level of the modulated signal are set in advance such that, when the modulated signal is in the first signal level, a light quantity of the light beam for scanning the heat mode recording material is set to a base light quantity not sufficient for recording an image on the surface of the heat mode recording material, and when the modulated signal is in the second signal level, the light quantity of the light beam for scanning the heat mode recording material is set to a target light quantity sufficient for recording an image on the surface of the heat mode recording material.

In this case, when the light quantity of the light beam for scanning the heat mode recording material changes from the base light quantity to the target light quantity in accordance with rising of the modulated signal from the first signal level to the second signal level, or when the light quantity of the light beam for scanning the heat mode recording material changes from the target light quantity to the base light quantity in accordance with falling of the modulated signal from the second signal level to the first signal level, the light beam records contour parts of an image on the surface of the heat mode recording material.

Here, the light quantity of the light beam for scanning the heat mode recording material changes with a gradient at the timing of the rising or the falling of the modulated signal according to response characteristics or the like of a light source with respect to the modulated signal. An image is recorded by the light beam which scans the surface of the heat mode recording material with such changes in the light quantity. As a result, since the image is thin in contour parts of the image, the contour parts may be blurred.

Here, for example, there is proposed an image recording apparatus which generates a differential signal obtained by inputting a modulated signal, which is generated on the basis of image information, to a differential circuit and an integration signal obtained by inputting the modulated signal to an integration circuit, and adds the differential signal and the integration signal to the modulated signal so as to increase a level immediately after rising of the modulated signal and increases a level immediately before falling of the modulated signal, respectively, to generate a drive signal to be applied to the light source (e.g., see JP 8-23422 A, in particular, see pages 4 to 9 and FIG. 4 thereof). In such a light beam emitted by the light source according to the drive signal, a light quantity at the timing of rising or falling of the drive signal increases compared with the case in which only the modulated signal is applied to the light source as the drive signal. Since contour parts of an image, which is recorded when the light quantity of this light beam increases, become thick, the contour parts are highlighted.

However, in the image recording apparatus disclosed in the above-mentioned laid-open patent application, the differential signal and the integration signal, which are added to the modulated signal in order to highlight the contour parts of the image, are determined fixedly depending upon a circuit configuration inside the apparatus. Consequently, for example, when the image recording apparatus disclosed in the above-mentioned laid-open patent application is used for heat mode recording materials of plural qualities, even if contour parts of an image can be highlighted appropriately for a certain heat mode recording material, if the heat mode recording material is replaced with a heat mode recording material with a different quality, it is likely that the light quantity of the light beam, which was increased by the differential signal and the integration signal in order to highlight the contour parts of the image, is insufficient for the heat mode recording material with a different quality or, to the contrary, the light quantity of the light beam is excessive.

If the light quantity of the light beam is insufficient, the contour parts of the image are blurred without being highlighted sufficiently.

In addition, if the light quantity of the light beam is excessive, abrasion is likely to occur. The abrasion is a phenomenon in which, when a light quantity of a light beam irradiated on a heat mode recording material is excessive, a heat-sensitive material in a part where the light beam is irradiated is scattered, causing such a problem that the scattered heat-sensitive material is likely to contaminate an optical system around it or adversely affects human bodies.

In order to cope with the abrasion, for example, it is necessary to additionally provide the image recording apparatus with a suction apparatus or the like for sucking the heat-sensitive material or the like scattered by the abrasion. The image recording apparatus added with such a suction apparatus has such a drawback as to be large in size and expensive.

On the other hand, as described above, in the technique of the CTP, a lighting state of a light beam irradiated from a light source for exposure is controlled by a binarized image signal (modulated signal), which is generated on the basis of image data of an original image to be recorded, and the light source for exposure and the photosensitive material are relatively moved. Consequently, the photosensitive material is scanned two-dimensionally with the light beam, and a desired image is recorded on the photosensitive material.

As is well known, an image for plate making is a so-called halftone gradation image using halftones. Each halftone is recorded by a set of large number of dots, which are formed by scan exposure using a light beam having a size previously determined in accordance with a resolution.

In such scan exposure by a light beam, regardless of how high responsiveness of the light source for exposure and responsiveness of a binarized image signal to be applied to the light source are, a density of an image generated on the photosensitive material as a result of exposure has a gradient in the vicinity of contour parts of the image, a density distribution inevitably having a trapezoidal shape. This problem results in blurring of edges of an image which is recorded after exposure and development.

With respect to this problem, for example, as disclosed in the above-mentioned JP 8-23422 A, there is proposed an image recording apparatus for recording an image by scanning a photosensitive material with a light beam, which is characterized by including: means which outputs a binarized image signal having a first level and a second level larger than the first level; differential signal generation means which generates a differential signal, which appears when the binarized image signal changes from the first level to the second level, among signals obtained by differentiating the binarized image signal on the basis of the level change of the binarized image signal; exposure signal generation means which synthesizes the binarized image signal and the differential signal to generate an exposure signal having the first level, the second level, and a third level larger than the second level; and light beam emitting means which emit the light beam of a light quantity corresponding to each level of the exposure signal applied thereto.

That is, this technique enables the decrease in the light quantity at edge parts to be eliminated by controlling the image recording apparatus to give a larger light quantity in parts corresponding to edges of dots of a generated image than in other parts.

In addition, it is an object of a technique disclosed in JP 2001-96794 A to reproduce dots smaller than a diameter of a recording beam satisfactorily in forming an electrostatic latent image by scanning a recording material with a laser beam modulated in accordance with image data in an image forming apparatus of an electrostatic system.

With this technique, there is provided a scan exposure apparatus for lighting a semiconductor laser on the basis of image information to scan and expose a photosensitive member (photosensitive material) with a laser beam outputted from the semiconductor laser, which is characterized in that a light intensity of the laser beam at its rising is made higher than a light intensity at a fixed time every time the laser beam is lit once, and in particular, characterized in that the light intensity of the laser beam at its rising is made higher than the light intensity at the stationary time.

In addition, with this technique, consequently, there is an effect that an amount of exposure of a photosensitive member in the vicinity of a lighting start position of the semiconductor laser, where only a shallow and narrow latent image can be formed conventionally, can be increased and it becomes possible to form a deep and wide latent image.

Incidentally, problems in the CTP process includes, in addition to the above, fluctuation in focus due to a position of a photosensitive material, that is, existence of focused parts and defocused parts. There are various causes for this problem such as non-uniformity of material support in an exposure part of a photosensitive material (exposure machine). Details of the causes will be described later.

In addition, other problems in the CTP process include fluctuation in sensitivity due to a photosensitive material or a processing system. There are various causes for this problem such as fluctuation in sensitivity of the photosensitive material itself and change over time thereof, or fluctuation in activity of a processing liquid (hereinafter also referred to as liquid activity). Details of these causes will be described later as well.

It is needless to mention that the above-mentioned existence of defocused parts or occurrence of fluctuation in sensitivity significantly degrades a quality of a printing plate manufactured by the CTP process (more accurately, an image quality), and measures to cope with these problems are required at any cost. However, conventionally, although correction for the defocus has been performed by the autofocus (AF) mechanism, correction for both the defocus and the fluctuation in sensitivity has been hardly considered.

This will be described below in more detail.

As shown in FIG. 24A, in a position where a recording beam is focused (position indicated by P1 in the figure), a shape of the recording beam is narrowed to be sharp and a peak value is high (a shape indicated by B1 in FIG. 24B). On the other hand, in a position where defocus occurs (P2 and P3 in FIG. 24A), a shape of the recording beam changes from B1 to B2 and, then, to B3 according to a degree of defocus as shown in FIG. 24B (more specifically, the peak value drops and a beam diameter increases).

Due to such a phenomenon, a size of dots to be formed increases and sufficient energy is not given in the defocus position. Therefore, quality of the dots is degraded, and as a result, degradation of image quality such as a change in mesh % is caused. However, there is a problem that conventionally, accurate correction regarding such a point has not been performed.

On the other hand, in the case in which the fluctuation in sensitivity due to a photosensitive material or a processing system occurs, the mesh % is changed. More specifically, as schematically shown in FIG. 25, in the case of a photosensitive material with low sensitivity, the mesh % tends to be changed relatively significantly, a photosensitive material with a standard sensitivity tends to be affected less, and a photosensitive material with high sensitivity tends to be hardly affected. However, there is a problem that accurate correction regarding this point has not been specifically performed.

After all, conventionally, the image recording apparatus has been used in a state in which it includes various problems, that is, in a state in which an image quality of a printing plate manufactured by the CTP process is not always satisfactory.

SUMMARY OF THE INVENTION

The present invention has been devised in view of the above-mentioned circumstances, and it is a first object of the present invention to provide an image recording apparatus which can highlight contour parts of an image according to a quality of a photosensitive material such as a heat mode recording material while preventing occurrence of abrasion.

In addition, the present invention has been devised in view of the above-mentioned circumstances, and it is a second object of the present invention to provide an image forming method and an image forming apparatus which solve the problems in the related art and which enable stable image quality to be maintained with respect to defocus due to various causes or fluctuation in sensitivity due to a photosensitive material or a processing system.

Here, causes of the defocus which should be considered include eccentricity of a drum in a CTP machine of an external drum system, insufficiency of planarity of a head in a CTP machine of a flat bed system, deformation of the drum, plate floating (due to intervention of dust, absorption failure, etc.), image surface curving or image surface toppling caused due to an optical system, focus adjustment failure of the optical system, temperature change of focus, fluctuation in a thickness of a photosensitive material (supporting body, photosensitive film), and AF (autofocus) adjustment residual of the optical system.

In addition, factors of the fluctuation in sensitivity which should be considered include fluctuation in sensitivity of a photosensitive material itself (locality among manufacture lots, in a lot, and in a surface in one photosensitive material, etc.), temperature and humidity characteristics of sensitivity of the photosensitive material, change over time of sensitivity of the photosensitive material, change in activity of a processing liquid, that is, a degree of liquid activity (electric conductivity/pH/liquid concentration, a liquid temperature, an elapsed time after preparing a new liquid, a processing amount of the photosensitive material after preparing the new liquid, etc.), fluctuation in a processing time, fluctuation/locality of physical processing (brush pressure), a detection error, a correction residual, etc. of the degree of activity (liquid activity).

In order to attain the first object described above, a first aspect of the present invention provides an image recording apparatus for scanning a heat mode recording material with a light beam modulated in accordance with image information, to thereby record an image on the heat mode recording material, comprising a modulated signal generation unit which generates a modulated signal, the modulated signal being transitioned in its signal level between a first signal level and a second signal level that is larger than the first signal level, according to the image information; an additional signal generation unit which generates at least one of: a pulse-like first additional signal having a signal level adjusted in accordance with a predetermined setting signal, the pulse-like first additional signal rising at a timing of rising of the modulated signal generated by the modulated signal generation unit and falling after lapse of a predetermined time; and a pulse-like second additional signal having a signal level adjusted in accordance with the predetermined setting signal, the pulse-like second additional signal rising earlier than the timing of falling of the modulated signal by a predetermined time and falling at a timing of falling of the modulated signal; and a drive signal generation unit which generates a drive signal for driving a light source emitting the light beam by adding at least one of the first additional signal and the second additional signal generated by the additional signal generation unit to the modulated signal generated by the modulated signal generation unit.

In the image recording apparatus according to a first embodiment of the first aspect of the present invention, preferably, the additional signal generation unit generates the first additional signal, and the drive signal generation unit adds the first additional signal to the modulated signal to generate the drive signal.

In the image recording apparatus according to a second embodiment of the first aspect, preferably, the additional signal generation unit generates the second additional signal, and the drive signal generation unit adds the second additional signal to the modulated signal to generate the drive signal.

And, in the image recording apparatus according to a third embodiment of the first aspect, preferably, the additional signal generation unit generates both of the first and second additional signals, and the drive signal generation unit adds to the modulated signal the both of the first and second additional signals to generate the drive signal.

In such an image recording apparatus, as a light quantity of a light beam for recording an image, a light quantity immediately after the light source is turned ON and recording of an image is started, a light quantity immediately before the light source is turned OFF and recording of the image is finished, and both of these quantities of light increase by a quantity equivalent to signal levels of the first and second additional signals in the image recording apparatus of the first embodiment of the first aspect of the present invention, the image recording apparatus of the second embodiment of the first aspect, and the image recording apparatus of the third embodiment of the first aspect, respectively. Here, parts recorded by the light beam immediately after the light source is turned ON and recording of an image is started and immediately before the light source is turned OFF and recording of the image is finished become contour parts of the image to be recorded by the light beam. Therefore, the image recording apparatuses of the first, second, and third embodiments of the first aspect of the present invention can highlight the contour parts of the image.

Moreover, in the image reading apparatuses of the first, second, and third embodiments of the first aspect of the present invention, the signal levels of the first and second additional signals are adjusted according to a predetermined setting signal. By adjusting this setting signal to a value according to a quality of a heat mode recording material, the signal levels of the first and second additional signals can be changed to signal levels conforming to a heat mode recording material to be set in the image recording apparatuses. As a result, occurrence of abrasion due to an excessive light quantity is prevented while contour parts of an image to be recorded on the heat mode recording material are highlighted sufficiently.

In order to attain the second object described above, a second aspect of the present invention provides an image forming method, comprising scanning a photosensitive material with a light beam; and recording an image, wherein a power of the light beam is set to a power of a level at which a recording line width or a recording dot size, which is determined depending upon a threshold value for the photosensitive material to blacken, is substantially fixed even if defocus occurs.

Note that the threshold value for the photosensitive material to blacken is actually determined depending upon not only the photosensitive material but also a combination of the photosensitive material and development processing. However, it is simply represented as "the threshold value for the photosensitive material to blacken".

Preferably, the power of the light beam at best focus is of a level at which an intensity level of from 40% to 60% of a peak intensity of the light beam is substantially equal to the threshold value for the photosensitive material to blacken.

And, preferably, the power of the light beam is 1.8 to 2.2 times a reference exposure power.

Here, the reference exposure power is standardized power, and indicates, for example, in the case in which the photosensitive material is a positive material, a value found by dividing a value of the reference exposure power by power with which a clear state is obtained (here, such power is called clear power), and in the case in which the photosensitive material is a negative material, a value found by dividing a value of the reference exposure power by power with which a shoulder state is obtained (here, such power is called shoulder power).

Preferably, the power of the light beam is differentiated at an edge part and a non-edge part of a recorded image.

And, preferably, the power of the light beam at the edge part of the recorded image is the power of any one of the various light beams described above, that is, the power of a level at which a recording line width or a recording dot size is substantially fixed even if defocus occurs, the level at which an intensity level of from 40% to 60% of a peak intensity of the light beam is substantially equal to the threshold value for the photosensitive material to blacken, or the power of the light beam is 1.8 to 2.2 times a reference exposure power, and the power of the light beam at the non-edge part of the recorded image is smaller than the power of the light beam at the edge part of the recorded image.

A length of the edge part of the recorded image preferably corresponds to 0.5 to 4 pixels, and most preferably corresponds to 2 pixels.

Preferably, the edge part of the recorded image is at least one of a side perpendicular to a main scanning direction and a side in the main scanning direction. And, preferably, the edge part of the recorded image is the side perpendicular to the main scanning direction and the side in the main scanning direction.

In order to attain the second object described above, a second aspect of the present invention provides an image forming apparatus for recording an image by scanning a photosensitive material, which is supported by a photosensitive material supporting unit, with a light beam irradiated from a light source, comprising a detecting unit which detects at least a part of an edge part of an image signal to be recorded; a parameter setting unit which sets parameters for processing, which increases a light quantity at an edge part perpendicular to a main scanning direction, based on image output information; and a light source drive signal generation unit which drives the light source based on timing information for image recording.

Preferably, the light source drive signal generation unit applies power of a light beam in accordance with the image forming method according to the above-mentioned second aspect to an edge in accordance with the image forming method according to the above-mentioned second aspect.

In addition, there is no specific limitation concerning the photosensitive material used for the image forming method or the image forming apparatus according to the second aspect of the present invention. However, a large effect is obtained in the case in which a photosensitive material with a small light integration effect, for example, a photosensitive material (thermal photosensitive material) such as a heat mode recording material is used.

In order to attain the second object described above, a third aspect of the present invention provides an image forming method according to the above-mentioned second aspect and further comprising differentiating an exposure power of the light beam at the edge part and the non-edge part perpendicular to the main scanning direction; and controlling a recording time required for the recorded image according to the differentiated exposure power of the light beam.

Preferably, the power of the light beam at the edge part at best focus is of a level at which an intensity level of from 40% to 60% of a peak intensity of the light beam is substantially equal to the threshold value for the photosensitive material to blacken.

And, preferably, the power of the light beam at the edge part is 1.8 to 2.2 times a reference exposure power.

A length of the edge part of the recorded image preferably corresponds to 0.5 to 4 pixels, and most preferably corresponds to 2 pixels.

In order to attain the second object described above, the image forming apparatus according to the third aspect of the present invention is the image forming apparatus according to the second aspect and further comprises an image recording time control unit which controls an image recording time based on an output of the parameter setting unit.

Further, in order to attain the second object described above, a first embodiment of a fourth aspect of the present invention provides the image forming method according to the above-mentioned second aspect and further comprising differentiating an exposure power of the light beam at exposure the edge part and the non-edge part of the recorded image; subjecting the photosensitive material to exposure and development processing to form a predetermined pattern thereon, thereby manufacturing a sample; measuring a density or mesh % of the sample; calculating a difference between the measured density or mesh % and a specified density or mesh %; and correcting fluctuation in sensitivity due to factors of fluctuation in sensitivity in an exposure and development processing system for the photosensitive material based on the calculated difference.

Preferably, the step of correcting fluctuation in sensitivity includes controlling at least one of the exposure power of the light beam at the edge part at exposure of the photosensitive material; the exposure power of the light beam at the non-edge part; a length and/or a width of the edge part; an image recording time; a development time or a conveyance speed of the photosensitive material; electric conductivity/pH/liquid concentration of a processing liquid; and a processing liquid temperature.

In order to attain the second object described above, a second embodiment of the fourth aspect provides the image forming method according to the first embodiment of the fourth aspect described above and further comprising controlling a recording time required for the recorded image in accordance with the exposure power of the light beam differentiated at the edge part and the non-edge part of the recorded image.

Preferably, the step of correcting fluctuation in sensitivity includes controlling at least one of the exposure power of the light beam at the edge part at exposure of the photosensitive material; the exposure power of the light beam at the non-edge part; a length and/or a width of the edge part; an image recording time; a development time or a conveyance speed of the photosensitive material; electric conductivity/pH/liquid concentration of a processing liquid; and a processing liquid temperature.

In order to attain the second object described above, a third embodiment of the fourth aspect of the present invention provides the image forming method according to the above-mentioned second aspect of the present invention and further comprising differentiating an exposure power of the light beam at exposure the edge part and the non-edge part of the recorded image; detecting characteristics for exposure/development processing of the photosensitive material; comparing detected values with respective specified values to calculate a difference; and correcting fluctuation in sensitivity due to factors of fluctuation in sensitivity in an exposure/development processing system for the photosensitive material based on the calculated difference.

Here, preferably, the aforementioned characteristics are at least one of an ambient temperature of the photosensitive material at exposure of the photosensitive material; an ambient temperature of a light quantity detector; the exposure power of the light beam at the edge part at exposure of the photosensitive material; the exposure power of the light beam at the non-edge part; a length and/or a width of the edge part; an image recording time; a development time or a conveyance speed of the photosensitive material; electric conductivity/pH/liquid concentration of a processing liquid; an elapsed time or a processing amount of the photosensitive material after preparing a new processing liquid; and a processing liquid temperature, and the step of correcting fluctuation in sensitivity includes controlling at least one of the exposure power of the light beam at the edge part at exposure of the photosensitive material, the exposure power of the light beam at the non-edge part, the length and/or the width of the edge part, the image recording time, the development time or the conveyance speed of the photosensitive material, the electric conductivity/pH/liquid concentration of the processing liquid, and the processing liquid temperature among the characteristics.

In order to attain the second object described above, a fourth embodiment of the fourth aspect of the present invention provides the image forming method according to the third embodiment of the fourth aspect described above and further comprising controlling a recording time required for the recorded image in accordance with the exposure power of the light beam differentiated at the edge part and the non-edge part of the recorded image.

Here, preferably, the aforementioned characteristics are at least one of an ambient temperature of the photosensitive material at exposure of the photosensitive material; an ambient temperature of a light quantity detector; the exposure power of the light beam at the edge part at exposure of the photosensitive material; the exposure power of the light beam at the non-edge part; a length and/or a width of the edge part; an image recording time; a development time or a conveyance speed of the photosensitive material; electric conductivity/pH/liquid concentration of a processing liquid; an elapsed time or a processing amount of the photosensitive material after preparing a new processing liquid; and a processing liquid temperature, and the step of correcting fluctuation in sensitivity includes controlling at least one of the exposure power of the light beam at the edge part at exposure of the photosensitive material, the exposure power of the light beam at the non-edge part, the length and/or the width of the edge part, the image recording time, the development time or the conveyance speed of the photosensitive material, the electric conductivity/pH/liquid concentration of the processing liquid, and the processing liquid temperature among the characteristics.

In order to attain the second object described above, a fifth embodiment of the fourth aspect of the present invention provides the image forming method according to the above-mentioned second aspect and comprising differentiating an exposure power of the light beam at exposure at the edge part and the non-edge part of the recorded image; subjecting the photosensitive material to exposure/development processing to form a predetermined pattern thereon, thereby manufacturing a sample; measuring a density or mesh % of the sample; calculating a first difference between the measured density or mesh % and a specified density or mesh %; calculating a control amount for correcting fluctuation in sensitivity due to factors of fluctuation in sensitivity in an exposure/development processing system for the photosensitive material based on the calculated first difference; storing the control amount, which is obtained as a result of the calculation, as a new set value; detecting characteristics for the exposure/development processing of the photosensitive material; comparing detected values with respective specified values including the new set value to calculate a second difference; correcting fluctuation in sensitivity due to factors of fluctuation in sensitivity in the exposure/development processing system for the photosensitive material based on the calculated second difference; and storing a characteristic value, which is used in the correction, as a new set value.

Preferably, the step of calculating a control amount includes calculating a control amount of at least one of the exposure power of the light beam at the edge part at exposure of the photosensitive material; the exposure power of the light beam at the non-edge part; a length and/or a width of the edge part; an image recording time; a development time or a conveyance speed of the photosensitive material; electric conductivity/pH/liquid concentration of a processing liquid; an elapsed time or a processing amount of the photosensitive material after preparing a new processing liquid; and a processing liquid temperature, and the step of correcting fluctuation in sensitivity includes correcting at least one of: the exposure power of the light beam at the edge part at exposure of the photosensitive material; the exposure power of the light beam at the non-edge part; the length and/or the width of the edge part; the image recording time; the development time or the conveyance speed of the photosensitive material; the electric conductivity/pH/liquid concentration of the processing liquid; and the elapsed time or the processing amount of the photosensitive material after preparing the new processing liquid.

In order to attain the second object described above, a sixth embodiment of the fourth aspect of the present invention provides the image forming method according to the third embodiment of the fourth aspect described above and further comprising controlling a recording time required for the recorded image in accordance with the exposure power of the light beam differentiated at the edge part and the non-edge part of the recorded image.

Preferably, the step of calculating a control amount includes calculating a control amount of at least one of the exposure power of the light beam at the edge part at exposure of the photosensitive material; the exposure power of the light beam at the non-edge part; a length and/or a width of the edge part; an image recording time; a development time or a conveyance speed of the photosensitive material; electric conductivity/pH/liquid concentration of a processing liquid; an elapsed time or a processing amount of the photosensitive material after preparing a new processing liquid; and a processing liquid temperature, and the step of correcting fluctuation in sensitivity includes correcting at least one of: the exposure power of the light beam at the edge part at exposure of the photosensitive material; the exposure power of the light beam at the non-edge part; the length and/or the width of the edge part; the image recording time; the development time or the conveyance speed of the photosensitive material; the electric conductivity/pH/liquid concentration of the processing liquid; and the elapsed time or the processing amount of the photosensitive material after preparing the new processing liquid.

In the above-mentioned fourth aspect, preferably, the power of the light beam at best focus is of a level at which an intensity level of from 40% to 60% of a peak intensity of the light beam is substantially equal to the threshold value for the photosensitive material to blacken.

And, preferably, the power of the light beam is 1.8 to 2.2 times a reference exposure power.

And, in order to attain the second object described above, the fourth aspect of the present invention provides an image forming apparatus comprising an exposure machine for forming an image by scanning a photosensitive material, which is supported by a photosensitive material supporting unit, with a light beam irradiated from a light source; and a development processing machine for subjecting an exposed photosensitive material to development processing, the image forming apparatus further comprising a acquiring unit for acquiring at least one of a measurement result of a density or mesh % of a given sample, which is exposed by the exposure machine and subjected to the development processing by the development processing machines and characteristics of exposure in the exposure machine and the development processing in the development processing machine; and a control unit for at least one of exposure conditions in the exposure machine and development processing conditions in the development processing machine based on information acquired by the acquiring unit.

BRIEF DESCRIPTION OF THE DRAWINGS

In the accompanying drawings:

FIG. 3 is a block diagram showing a circuit configuration of an exposure circuit of the image recording apparatus shown in FIG. 2 together with a sensor unit, a parameter setting unit, and a light source;

FIGS. 4A and 4B are diagrams showing waveforms of a modulated signal and a first additional signal which are used in a first embodiment of the first aspect of the present invention;

FIG. 5 is a diagram showing a waveform of a drive signal which is used in the first embodiment and a change in a quantity of light of a light beam which is emitted according to the drive signal;

FIGS. 6A and 6B are diagrams showing waveforms of a modulated signal and a second additional signal which are used in a second embodiment of the first aspect of the present invention;

FIG. 7 is a diagram showing a drive signal which is used in the second embodiment and a change in a light quantity of a light beam according to the drive signal;

FIGS. 8A and 8B are diagrams showing waveforms of a modulated signal and first and second additional signals which are used in a third embodiment of the first aspect of the present invention;

FIG. 9 is a diagram showing a drive signal which is used in the third embodiment and a change in a light quantity of a light beam according to the drive signal;

FIGS. 11A and 11B are enlarged explanatory views schematically showing a halftone image, in which FIG. 11A shows plural halftones and FIG. 11B shows one halftone among the plural halftones shown in FIG. 11A in a further enlarged form;

FIGS. 12A and 12B are explanatory diagrams concerning an increase in a light quantity based upon an increase in light emission energy in halftone formation, in which FIG. 12A is a graph showing a state in which the light quantity is not increased and FIG. 12B is a graph showing a state in which the light quantity is increased;

FIG. 13 is a graph showing an example of a relation between an amount of increase in a light quantity and an amount of change in mesh %;

FIGS. 14A and 14B are schematic views showing a state of an increase in a light quantity in this embodiment, in which FIG. 14A is a plan view and FIG. 14B is a sectional view;

FIGS. 19A and 19B are enlarged explanatory views schematically showing a halftone image, in which FIG. 19A shows plural halftones and FIG. 19B shows one halftone among the plural halftones shown in FIG. 19A in a further enlarged form;

FIG. 23 is a diagram in which factors of fluctuation in sensitivity and correction means therefor in a photosensitive material, an exposure machine, and an automatic development machine in an embodiment of the present invention are arranged;

DETAILED DESCRIPTION OF THE PREFERRED EMBODIMENT

An image recording apparatus, and an image forming method and an image forming apparatus in accordance with the present invention will be hereinafter described in detail with reference to preferred embodiments shown in the accompanying drawings.

First, an image recording apparatus of a first aspect of the present invention will be described with reference to FIGS. 1 to 9.

Figure 1:
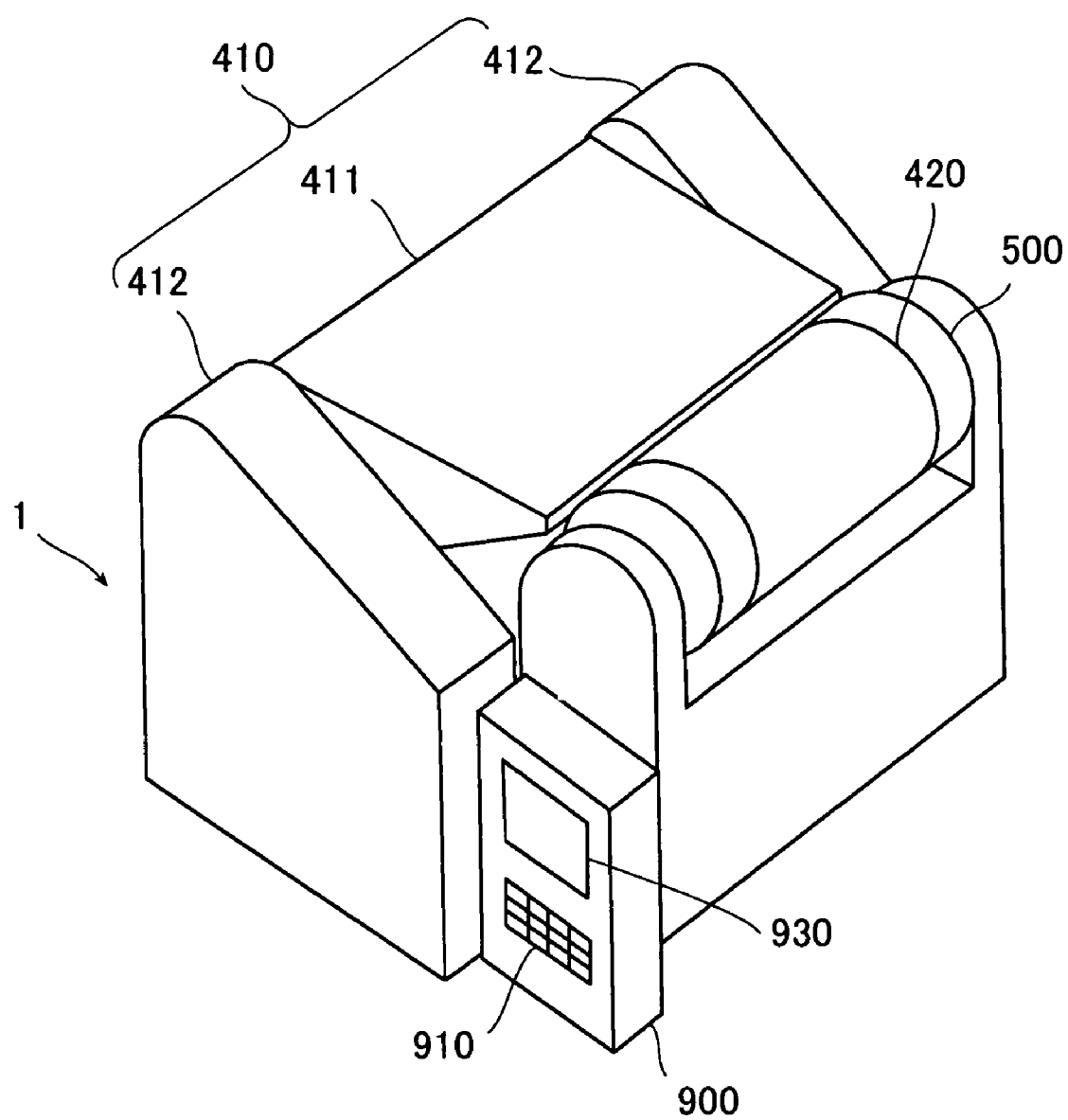
FIG. 1 is a perspective view showing an image recording apparatus in accordance with an embodiment of a first aspect of the present invention.

FIG. 1 is a perspective view showing a structure of the image recording apparatus in accordance with a first embodiment of the first aspect of the present invention.

An image recording apparatus 1 shown in FIG. 1 records an image on a heat mode recording material 420, which is a photosensitive material, fixed to a drum 500. Here, the heat mode recording material 420 is attached to or detached from the drum 500 by a photosensitive material replacement mechanism 410 constituted by a conveyance plate 411 and a conveyance plate drive mechanism 412 (covered). In a state in which the heat mode recording material 420 is fixed to the drum 500, when an operator inputs, from an input section 910 of a parameter setting unit 900, an instruction to start detachment of the heat mode recording material, the photosensitive material replacement mechanism 410 and the drum 500 are driven in response to this instruction to detach the heat mode recording material 420 from the drum 500. Subsequently, when the operator sets a new heat mode recording material 420 on the conveyance plate 411 and inputs information such as a size (longitudinal and lateral dimensions and thickness) of the new heat mode recording material 420 from the input section 910 of the parameter setting unit 900, the photosensitive material replacement mechanism 410 and the drum 500 are driven on the basis of this information to attach the new heat mode recording material 420 to the drum 500 appropriately. Here, the information or the like inputted to the parameter setting unit 900 by the operator is displayed on a display section 930 of the parameter setting unit 900.

The operator can replace an attached heat mode recording material with a new heat mode recording material by carrying out the detachment operation and the attachment operation described above. This new heat mode recording material may be a heat mode recording material of the same quality as the heat mode recording material attached before replacement or may be a heat mode recording material of a different quality.

Figure 2:
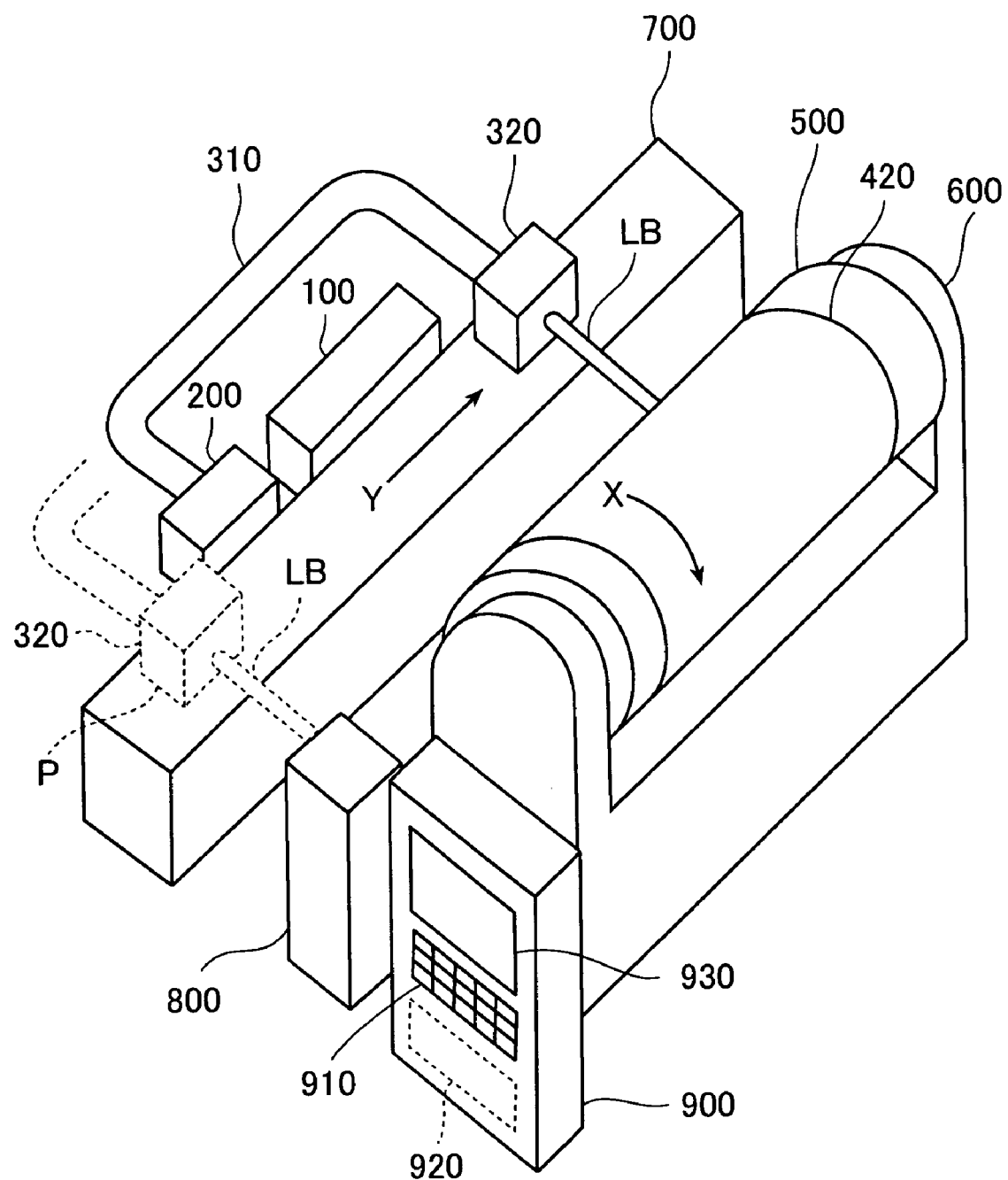
FIG. 2 is a perspective view showing an inside of the image recording apparatus shown in FIG. 1.

FIG. 2 is a perspective view showing the inside of the image recording apparatus 1 shown in FIG. 1. In FIG. 2, the photosensitive material replacement mechanism 410, which is described with reference to FIG. 1, is detached.

An exposure circuit unit 100 is shown in the upper left part of FIG. 2. This exposure circuit unit 100 drives a light source 200 on the basis of image information, which represents an original image to be recorded, to cause the light source to emit light. Although a laser diode serving as a solid-state light-emitting device is used as the light source 200 in this embodiment, the light source 200 is not specifically limited, and a light-emitting diode or the like may be used. A light beam emitted by the light source 200 is transmitted to an exposure head 320 through an optical fiber cable 310 and is irradiated on the surface of the heat mode recording material 420 fixed to the surface of the drum 500 from this exposure head 320. The exposure head 320 is moved in a sub-scanning direction Y by an exposure head drive mechanism 700. Further, the drum 500 is rotated in a main scanning direction X by a drum drive mechanism 600. Therefore, the heat mode recording material 420 is scanned by a light beam LB, which is irradiated toward the heat mode recording material 420 from the exposure head 320, in the main scanning direction (X direction) in accordance with the rotation of the drum 500. Moreover, the exposure head 320 is moved in the sub-scanning direction Y by a predetermined distance while the drum 500 is rotated once, whereby the heat mode recording material 420 is also scanned in the sub-scanning direction Y by the light beam LB. The heat mode recording material 420 is scanned by the light beam LB in this way, whereby an image is recorded on the heat mode recording material 420.

In addition, when the heat mode recording material is replaced with the new heat mode recording material by the above-mentioned operations, the operator sets a light quantity of the light beam LB to a light quantity suitable for a quality of the new heat mode recording material. Here, a set value of the light quantity suitable for the quality of heat mode recording material is stored in a memory 920 of the parameter setting unit 900 together with an identification number indicating the heat mode recording material. In setting the light quantity, when the operator inputs an identification number indicating the heat mode recording material from the input section 910 of the parameter setting unit 900, the parameter setting unit 900 reads out the set value of the light quantity suitable for the heat mode recording material corresponding to the identification number. Subsequently, the exposure head 320 is moved to a position P to face a light-receiving surface of a sensor unit 800. The sensor unit 800 receives the light beam LB irradiated from the exposure head 320 moved to this position P. The sensor unit 800 outputs a signal representing a light quantity of the received light beam LB to the parameter setting unit 900. The parameter setting unit 900 compares the light quantity represented by the output signal of the sensor unit 800 and the set value of the light quantity suitable for the heat mode recording material read out from the memory 920; and outputs a control signal described later to the exposure circuit unit 100 which is driving the light source 200. This control signal controls the exposure circuit unit 100 to thereby function to increase or decrease a light quantity of the light beam emitted by the light source 200 driven by the exposure circuit unit 100. The parameter setting unit 900 adjusts this control signal to match the light quantity of the light beam LB represented by the output signal of the sensor unit 800 with the set value of the light quantity read out from the memory 920. In this way, the light quantity of the light beam LB emitted from the exposure head 320 is set to the light quantity suitable for the heat mode recording material. In addition, the control signal is fixed to an adjusted value at the time when the light quantity is set. This fixed control signal is stored in the memory 920 of the parameter setting unit 900. When the light beam LB emitted from the exposure head 320 records an image, the parameter setting unit 900 reads out this fixed control signal from the memory 920 and outputs the signal to the exposure circuit unit 100.

FIG. 3 is a block diagram showing a circuit configuration of the exposure circuit unit 100 shown in FIG. 2 together with the sensor unit 800, the parameter setting unit 900, and the light source 200 shown in FIG. 2.

The parameter setting unit 900 shown in FIG. 3 receives image data Dg representing an image to be recorded, which is obtained by an image reading apparatus (not shown), from the image reading apparatus and stores the image data Dg in the memory 920. Based upon this image data Dg, the parameter setting unit 900 generates a bias switch drive signal $M_1$, a modulation switch drive signal $M_2$, and an additional signal modulation switch drive signal $M_3$, which control ON/OFF of switches described later, and outputs the signals to the exposure circuit unit 100. Moreover, the control signal, which was fixed at the time of setting the light quantity, is stored in the memory 920 of the parameter setting unit 900 as described above. As this control signal, there are three types of signals, namely, a bias level setting signal $S_1$, a light quantity level setting signal $S_2$, and an additional light quantity level setting signal $S_3$. The parameter setting unit 900 reads out those control signals from the memory 920 and outputs the signals to the exposure circuit unit 100.

Here, the bias level setting signal $S_1$ is a setting signal for setting a quantity of the light beam LB, which is irradiated on the heat mode recording material 420 from the exposure head 320 shown in FIG. 2, to a base light quantity insufficient for recording an image on the heat mode recording material 420. As described above, the light beam LB irradiated from the exposure head 320 is a light beam emitted from the light source 200 and transmitted to the exposure head 320 via the optical fiber cable 310 shown in FIG. 2. Here, a laser diode is used for this light source 200. The laser diode has characteristics of not emitting light until a signal level of an excitation signal I inputted thereto exceeds a predetermined level. Therefore, in this embodiment, the signal level of the excitation signal I is set to be always slightly smaller than the predetermined level using the bias level setting signal $S_1$ to excite the light source 200 to a state immediately before light emission such that the light source 200 emits light immediately when the signal level of the excitation signal I increases in order to record an image. Here, the light source 200 is in the state immediately before light emission, and therefore the base light quantity is zero in this embodiment.

Further, the light quantity level setting signal $S_2$ is a setting signal for setting a quantity of the light beam LB, which is irradiated on the heat mode recording material 420 from the exposure head 320 shown in FIG. 2, to a target light quantity sufficient for recording an image on the heat mode recording material 420.

Moreover, the additional light quantity level setting signal $S_3$ is a setting signal for setting an additional light quantity to be added to the target light quantity.

Setting of those base light quantity, target light quantity, and additional light quantity will be described later.

A D/A conversion section 140 of the exposure circuit unit 100 shown in FIG. 3 converts those setting signals from digital signals to analog signals.

A bias signal generation section 150 includes an amplifier circuit 151 consisting of resistors 151a and 151b and an operational amplifier 151c, and a bias switch 152. The bias level setting signal $S_1$, which is inputted to the bias signal generation section 150 via the D/A conversion section 140, is amplified by the amplifier circuit 151 to turn into a bias signal $L_1$. This bias signal $L_1$ is outputted to a drive signal generation section 180 when the bias switch 152 is turned ON by the bias switch drive signal $M_1$ which is inputted to the bias signal generation section 150 from the parameter setting unit 900. In this embodiment, the bias switch 152 is controlled by the bias switch drive signal $M_1$ so as to be always turned ON during the operation of the image recording apparatus 1 shown in FIG. 1.

A modulated signal generation section 160 includes an amplifier circuit 161 consisting of resistors 161a and 161b and an operational amplifier 161c, and a modulation switch 162. The light quantity level setting signal $S_2$, which is inputted to the modulated signal generation section 160 via the D/A conversion section 140, is amplified by the amplifier circuit 161 to turn into a light quantity signal $L_2$. The modulation switch 162 is turned ON/OFF by the modulation switch drive signal $M_2$ inputted to the modulated signal generation section 160 from the parameter setting unit 900, whereby a pulse-like modulated signal $V_1$, a signal level of which transitions between zero and the signal level of the light quantity signal $L_2$, is outputted to the drive signal generation section 180.

An additional signal generation section 170 includes an amplifier circuit 171 consisting of resistors 171a and 171b and an operational amplifier 171c, and an additional signal modulation switch 172. The additional light quantity level setting signal $S_3$, which is inputted to the additional signal generation section 170 via the D/A conversion section 140, is amplified by the amplifier circuit 171 to turn into an additional light quantity signal $L_3$. The additional signal modulation switch 172 is turned ON/OFF by the additional signal modulation switch drive signal $M_3$ inputted to the additional signal generation section 170 from the parameter setting unit 900, whereby a pulse-like additional signal $V_2$, a signal level of which transitions between zero and the signal level of the additional light quantity signal $L_3$, is outputted to the drive signal generation section 180.

The drive signal generation section 180 is an adder circuit including resistors 180a, 180b, 180c, and 180d, and an operational amplifier 180e. The bias signal $L_1$ outputted from the bias signal generation section 150, the modulated signal $V_1$ outputted from the modulated signal generation section 160, and the additional signal $V_2$ outputted from the additional signal generation section 170 are added up by the drive signal generation section 180 and outputted to a light source drive circuit 190 as a drive signal $V_3$.

The light source drive circuit 190 generates the excitation signal I in response to the drive signal $V_3$ outputted from the drive signal generation section 180 and applies the excitation signal to the light source 200. The light source 200 emits light in response to this excitation signal I.

FIGS. 4A and 4B are diagrams showing waveforms of the modulated signal $V_1$ and the additional signal (first additional signal) $V_2$, respectively.

The signal level of the modulated signal $V_1$ shown in FIG. 4A transitions between zero and the signal level of the light quantity signal $L_2$ as described above. Here, when the modulation switch 162 shown in FIG. 3 is turned OFF, the signal level of the modulated signal $V_1$ becomes zero, and when the modulation switch 162 is turned ON, the signal level of the modulation signal $V_1$ becomes the signal level of the light quantity signal $L_2$.

In addition, the signal level of the additional signal (first additional signal) $V_2$ shown in FIG. 4B transitions between zero and the signal level of the additional light quantity signal $L_3$ as described above. Here, when the additional signal modulation switch 172 shown in FIG. 3 is turned OFF, the signal level of the additional signal $V_2$ becomes zero, and when the additional signal modulation switch 172 is turned ON, the signal level of the additional signal $V_2$ becomes the signal level of the additional light quantity signal $L_3$. Here, the additional signal $V_2$ is a pulse-like signal (first additional signal) which rises from zero to the signal level of the additional light quantity signal $L_3$ at timing when the modulated signal $V_1$ shown in FIG. 4A rises, and falls from the signal level of the additional light quantity signal $L_3$ to zero at timing when a predetermined time $\tau 1$ has elapsed.

Next, the drive signal $V_3$, which is generated by adding up the modulated signal $V_1$ and the additional signal $V_2$ shown in FIGS. 4A and 4B, respectively and the bias signal $L_1$ shown in FIG. 3 with the drive signal generation section 180 shown in FIG. 3, and a light quantity Q of a light beam according to the drive signal $V_3$ will be described.

FIG. 5 is a diagram showing the drive signal $V_3$ and a change in the light quantity Q of the light beam according to the drive signal $V_3$.

A signal level of the drive signal $V_3$ shown in FIG. 5 immediately after rising of the signal is a signal level further increased by the signal level of the additional light quantity signal $L_3$ with respect to a signal level obtained by adding the light quantity signal $L_2$ to the bias signal $L_1$. As a result, the light quantity Q of the light beam according to the drive signal $V_3$ also changes to a light quantity Q3, which is a light quantity further increased by an additional light quantity Q2 corresponding to the signal level of the additional signal level $L_3$ with respect to a light quantity Q1 corresponding to a signal level obtained by adding the light quantity signal $L_2$ to the bias signal $L_1$, immediately after the light source 200 shown in FIG. 3 is turned ON.

Here, in an image to be recorded by the light beam irradiated from the exposure head 320 shown in FIG. 2, parts of the image, which are recorded by the light beam immediately after the light source 200 shown in FIG. 3 is turned ON, are equivalent to contour parts of the image. When the light beam records the image, if the light quantity Q thereof changes as shown in FIG. 5, the contour parts (contours of a front end in a scanning direction by the light beam) of the image are recorded by the light beam having the light quantity Q3, thereby the contour parts of the image are highlighted.

Next, setting of the base light quantity, the target light quantity, and the additional light quantity will be described using FIG. 3 while referring to FIG. 2. This light quantity setting is carried out when a heat mode recording material is changed to a new heat mode recording material. Here, the target light quantity is a light quantity sufficient for recording an image on a heat mode recording material, and the additional light quantity is a light quantity with which contour parts of an image can be highlighted while preventing occurrence of the abrasion when added to the target light quantity.

First, as described above, in replacing a heat mode recording material, the operator inputs an identification number indicating the heat mode recording material from the input section of the parameter setting unit 900. Then, as described above, the exposure head 320 shown in FIG. 2 is moved to the position P to face the light-receiving surface of the sensor unit 800. Next, the parameter setting unit 900 outputs the predetermined bias switch drive signal $M_1$, the modulation switch drive signal $M_2$, and the additional signal modulation switch drive signal $M_3$ to the exposure circuit unit 100 to turn ON the bias switch 152 and to turn OFF the modulation switch 162 and the additional signal modulation switch 172. Subsequently, the parameter setting unit 900 outputs the bias level setting signal $S_1$, which is set to a predetermined initial value, to the bias signal generation section 150 of the exposure circuit unit 100. The parameter setting unit 900 adjusts a value of the bias level setting signal $S_1$ such that a light quantity represented by a sensor signal Vs outputted from the sensor unit 800 becomes the value just before exceeding zero. The base light quantity is thus set. The value of the bias level setting signal $S_1$ at the time when the base light quantity is set is stored in the memory 920 of the parameter setting unit 900.

When the base light quantity is set, the parameter setting unit 900 changes the modulation switch drive signal $M_2$ to turn ON the modulation switch 162. Subsequently, the parameter setting unit 900 outputs the light quantity level setting signal $S_2$ set to a predetermined initial value to the modulated signal generation section of the exposure circuit unit 100. The parameter setting unit 900 adjusts a value of the light quantity level setting signal $S_2$ such that the light quantity represented by the sensor signal Vs outputted from the sensor unit 800 coincides with the target light quantity suitable for the heat mode recording material read out from the memory 920. The target light quantity is thus set. A value of the light quantity setting signal $S_2$ at the time when the target light quantity is set is stored in the memory 920 of the parameter setting unit 900.

When the target light quantity is set, the parameter setting unit 900 changes the additional signal modulation switch drive signal $M_3$ to turn ON the additional signal modulation switch 172. Subsequently, the parameter setting unit 900 outputs the additional light quantity level setting signal $S_3$ set to a predetermined initial value to the additional signal generation section of the exposure circuit unit 100. The parameter setting unit 900 adjusts a value of the additional light quantity level setting signal $S_3$ such that the sensor signal Vs outputted by the sensor unit 800 coincides with a light quantity which is obtained by adding up the target light quantity and the additional light quantity suitable for the heat mode recording material read out from the memory 920. The additional light quantity is thus set. A value of the additional light quantity level setting signal $S_3$ at the time when the additional light quantity is set is stored in the memory 920 of the parameter setting unit 900.

The above-mentioned setting is carried out every time a heat mode recording material to be used is changed, whereby the image recording apparatus 1 shown in FIG. 1 can also highlight contour parts of an image while preventing occurrence of the abrasion with respect to plural heat mode recording materials with different qualities.

Next, an image recording apparatus which is a second embodiment of the first aspect will be described.

The image recording apparatus of the second embodiment is the same as the image recording apparatus of the first embodiment, which was described with reference to FIGS. 1, 2, and 3, in its appearance, internal structure, circuit configuration, operation, and the like, and is different from the image recording apparatus of the first embodiment in waveforms of an additional signal and a drive signal and a change in a light quantity of a light beam according to the drive signal, which were described with reference to FIGS. 4 and 5. Therefore, concerning the image recording apparatus of the second embodiment, a description of the points identical with the first embodiment will be omitted, and the waveforms of an additional signal and a drive signal and the change in a light quantity of a light beam according to the drive signal, which are the differences from the first embodiment, will be described. In addition, description will be made by appropriately referring to FIGS. 2, 3, 4A, and 4B.

FIGS. 6A and 6B are diagrams showing waveforms of the modulated signal $V_1$ and the additional signal (second additional signal) $V_2$ in the image recording apparatus of the second embodiment, respectively.

A waveform of the modulated signal $V_1$ shown in FIG. 6A is the same as the waveform of the modulated signal in the first embodiment (see FIG. 4A).

On the other hand, the additional signal (second additional signal) $V_2$ shown in FIG. 6B is different from the additional signal (first additional signal) in the first embodiment (see FIG. 4B). The additional signal (second additional signal) $V_2$ is a pulse-like signal (second additional signal) which rises from zero to the signal level of the additional light quantity signal $L_3$ at timing which is earlier than timing when the modulated signal $V_1$ shown in FIG. 6A falls by a predetermined time τ2, and falls from the signal level of the additional light quantity signal $L_3$ to zero at timing when the modulated signal $V_1$ shown in FIG. 6A falls.

FIG. 7 is a diagram showing the drive signal $V_3$ and a change in the light quantity Q of the light beam according to the drive signal $V_3$ in the image recording apparatus of the second embodiment.

The drive signal $V_3$ shown in FIG. 7 is a signal which is generated by adding up the bias signal $L_1$, the modulated signal $V_1$ shown in FIG. 6A, and the additional signal $V_2$ shown in FIG. 6B. A signal level of the drive signal $V_3$ immediately before falling of the signal is a signal level further increased by the signal level of the additional light quantity signal $L_3$ with respect to a signal level obtained by adding the light quantity signal $L_2$ to the bias signal $L_1$. As a result, the light quantity Q of the light beam according to the drive signal $V_3$ also changes to the light quantity Q3, which is a light quantity further increased by the additional light quantity Q2 corresponding to the signal level of the additional signal level $L_3$ with respect to a light quantity Q1 corresponding to a signal level obtained by adding the light quantity signal $L_2$ to the bias signal $L_1$, immediately before the light source 200 shown in FIG. 3 is turned OFF.

Here, in an image to be recorded by the light beam irradiated from the exposure head 320 shown in FIG. 2, parts of the image, which are recorded by the light beam immediately before the light source 200 shown in FIG. 3 is turned OFF, are equivalent to contour parts of the image. When the light beam records the image, if the light quantity Q thereof changes as shown in FIG. 7, since the contour parts (contours of a back end in a scanning direction by the light beam) of the image are recorded by the light beam having the light quantity Q3, thereby the contour parts of the image are highlighted.

Next, an image recording apparatus which is a third embodiment of the first aspect will be described.

Here, the identical points and the different points between the image recording apparatus of the third embodiment and the image recording apparatus of the first embodiment are the same as those between the image recording apparatus of the second embodiment and the image recording apparatus of the first embodiment. Therefore, concerning the image recording apparatus of the third embodiment, again, a description of the points identical with the first embodiment will be omitted, and the waveforms of an additional signal and a drive signal and the change in a light quantity of a light beam according to the drive signal, which are the differences from the first embodiment, will be described. In addition, description will be made by appropriately referring to FIGS. 2, 3, 4A, and 4B.

FIGS. 8A and 8B are diagrams showing waveforms of the modulated signal $V_1$ and the additional signals (first and second additional signals) $V_2$ in the image recording apparatus of the third embodiment, respectively.

A waveform of the modulated signal $V_1$ shown in FIG. 8A is the same as the waveform of the modulated signal of in image recording apparatus of the first embodiment (see FIG. 4A).

On the other hand, additional signals (first and second additional signals) $V_2$ shown in FIG. 8B are pulse-like signals (first and second additional signals) which rise from zero to the signal level of the additional light quantity signal $L_3$ at timing when the modulated signal $V_1$ shown in FIG. 8A rises, fall from the signal level of the additional light quantity signal $L_3$ to zero at timing when a predetermined time τ1 has elapsed (first additional signal), rise again from zero to the signal level of the additional light quantity signal $L_3$ at timing which is earlier than timing when the modulated signal $V_1$ shown in FIG. 8A falls by a predetermined time τ2, and fall from the signal level of the additional light quantity signal $L_3$ to zero at timing when the modulated signal $V_1$ shown in FIG. 8A falls (second additional signal).

FIG. 9 is a diagram showing the drive signal $V_3$ and a change in the light quantity Q of the light beam according to the drive signal $V_3$ in the image recording apparatus of the third embodiment.

The drive signal $V_3$ shown in FIG. 9 is a signal which is generated by adding up the bias signal $L_1$, the modulated signal $V_1$ shown in FIG. 8A, and the additional signal (first and second additional signals) $V_2$ shown in FIG. 8B. This drive signal $V_3$ has levels immediately after rising and immediately before falling of the signal which are further increased by the signal level of the additional light quantity signal $L_3$ with respect to a level obtained by adding the modulated signal level $L_2$ to the bias signal $L_1$. As a result, the light quantity Q of the light beam according to the drive signal $V_3$ also changes to a light quantity Q3, which is further increased by an additional light quantity Q2 corresponding to the signal level of the additional signal level $L_3$ with respect to a light quantity Q1 corresponding to a level obtained by adding the light quantity signal $L_2$ to the bias signal $L_1$, immediately after the light source 200 shown in FIG. 3 is turned ON and immediately before the light source 200 is turned OFF.

Here, in an image to be recorded by the light beam irradiated from the exposure head 320 shown in FIG. 2, parts of the image, which are recorded by the light beam immediately after the light source 200 shown in FIG. 3 is turned ON and immediately before the light source 200 is turned OFF, are equivalent to contour parts of the image. When the light beam records the image, if the light quantity Q thereof changes as shown in FIG. 9, since the contour parts (contours of a front end and a back end in a scanning direction by the light beam) of the image are recorded by the light beam having the light quantity Q3, the contour parts of the image are highlighted.

As described above, according to the image recording apparatus of the first aspect of the present invention, contour parts of an image can be highlighted according to a quality of a heat mode recording material while preventing occurrence of the abrasion.

The image recording apparatus of the first aspect of the present invention is basically constituted as described above.

Next, an image forming method and an image forming apparatus of a second aspect of the present invention will be described with reference to FIGS. 10 to 17.

Figure 10:
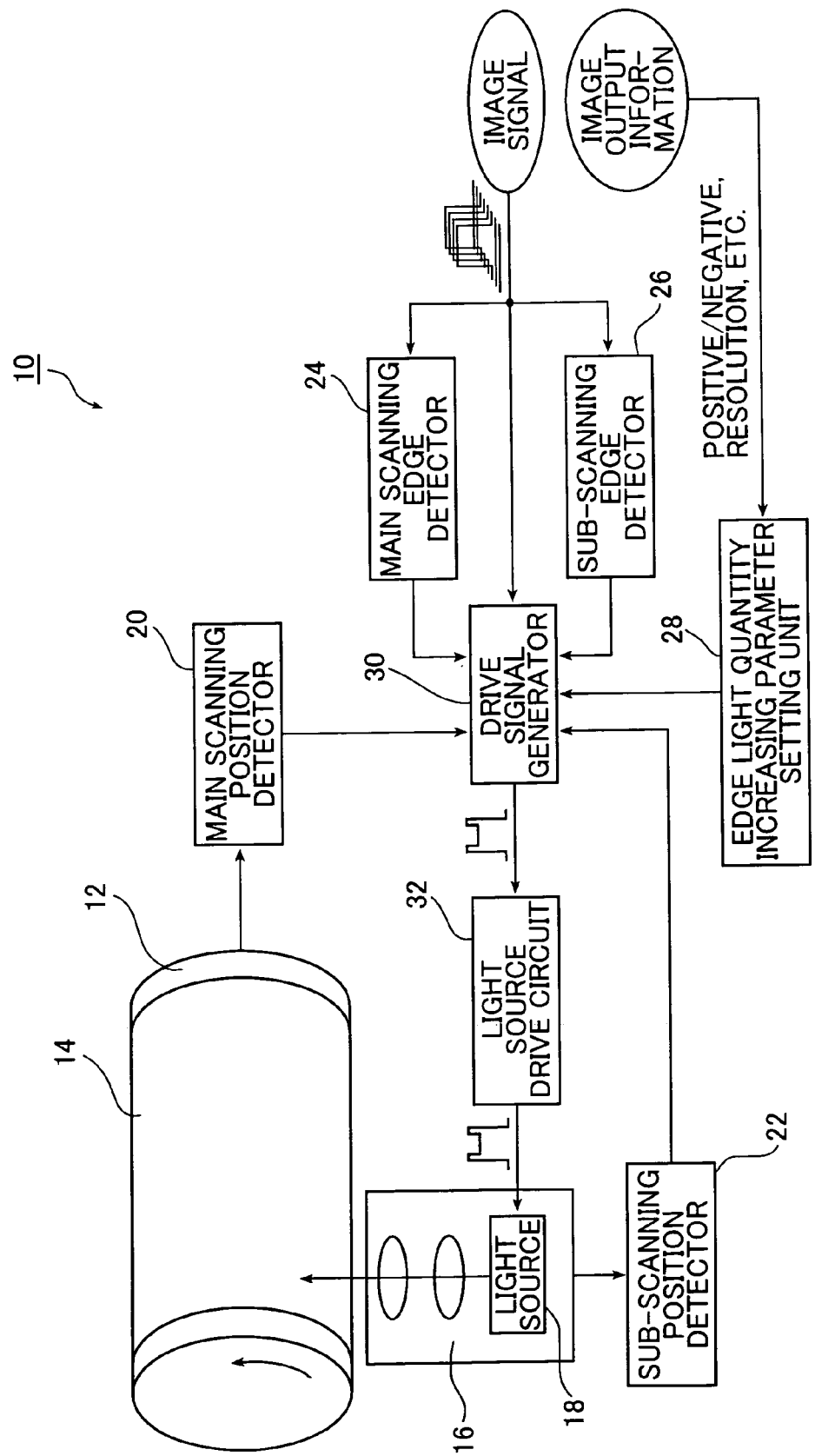
FIG. 10 is a block diagram showing a schematic structure of an image forming apparatus which implements an image forming method in accordance with an embodiment of a second aspect of the present invention.

FIG. 10 is a block diagram showing a schematic structure of an image forming apparatus which implements an image forming method in accordance with an embodiment of the second aspect of the present invention.

An image forming apparatus 10 of this embodiment shown in FIG. 10 incorporates a rotary drum (called an external drum) 12, which supportably mounts a photosensitive recording material (heat mode recording material) such as a PS plate (trade name: Pre-sensitized plate, Fuji Photo Film Co., Ltd.), that is, the photosensitive material 14 around an external circumference thereof as a mechanical drawing system, and a light source for exposure 18. Further, the image forming apparatus is also provided with a sub-scanning unit 16 which is movable along a length (axial) direction of the rotary drum 12.

In addition, the image forming apparatus 10 of this embodiment has a main scanning position detector 20, a sub-scanning position detector 22, a main scanning edge detector 24, a sub-scanning edge detector 26, an edge light quantity increasing parameter setting unit 28, a drive signal generator 30, and a light source drive circuit 32 as a control system thereof.

Here, the main scanning position detector 20 detects a rotation angle position of the rotary drum 12, the sub-scanning position detector 22 detects a position in the length direction of the rotary drum 12, the main scanning edge detector 24 detects an edge in a main scanning direction on the basis of an image signal to be inputted, the sub-scanning edge detector 26 detects edges in a sub-scanning direction on the basis of the image signal in the same manner, and the edge light quantity increasing parameter setting unit (hereinafter simply referred to as parameter setting unit) 28 sets parameters for increasing a light quantity at edge parts (hereinafter referred to as increase in edge light quantity) described later on the basis of image output information incidental to the image signal.

In addition, the drive signal generator 30 outputs a signal for controlling the light source drive circuit 32, which outputs a control signal for driving the light source 18, on the basis of various detection signals and setting information from the above-mentioned respective detectors (the main scanning position detector 20, the sub-scanning position detector 22, the main scanning edge detector 24, the sub-scanning edge detector 26, and the parameter setting unit 28).

Note that, in FIG. 10, the image forming apparatus 10 is described with an exposure machine for exposing the photosensitive material 14 and drawing an image thereon as a main component thereof. However, it is needless to mention that the image forming apparatus 10 may be provided with components necessary for various kinds of plate making of a development processing machine such as an automatic development machine for subjecting an exposed photosensitive material to development processing.

In the image forming apparatus 10 in accordance with this embodiment constituted as described above, edges in the main scanning direction and the sub-scanning direction are detected from an inputted image signal by the main scanning edge detector 24 and the sub-scanning edge detector 26, and parameters for increase in an edge light quantity are set by the parameter setting unit 280 on the basis of image output information, and these pieces of information are sent to the drive signal generator 30.

The drive signal generator 30 sends an instruction such that a light quantity in a predetermined length (width) is increased, that is, light emission intensity is increased for edge parts of halftones forming an image on the basis of these pieces of information and position detection information from the main scanning position detector 20 and the sub-scanning position detector 22.

Details of the above will be hereinafter described.

Figure 11A:
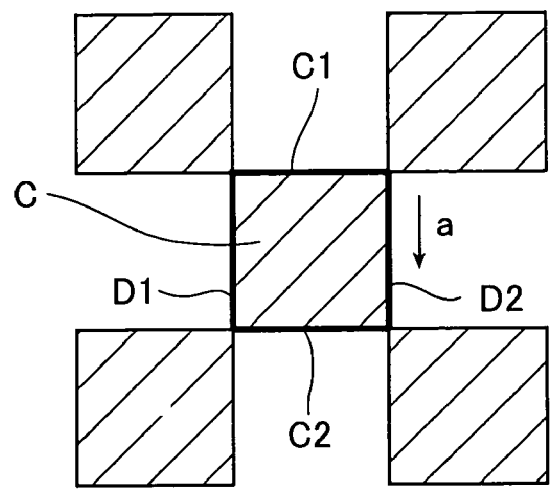
Figure 11B:
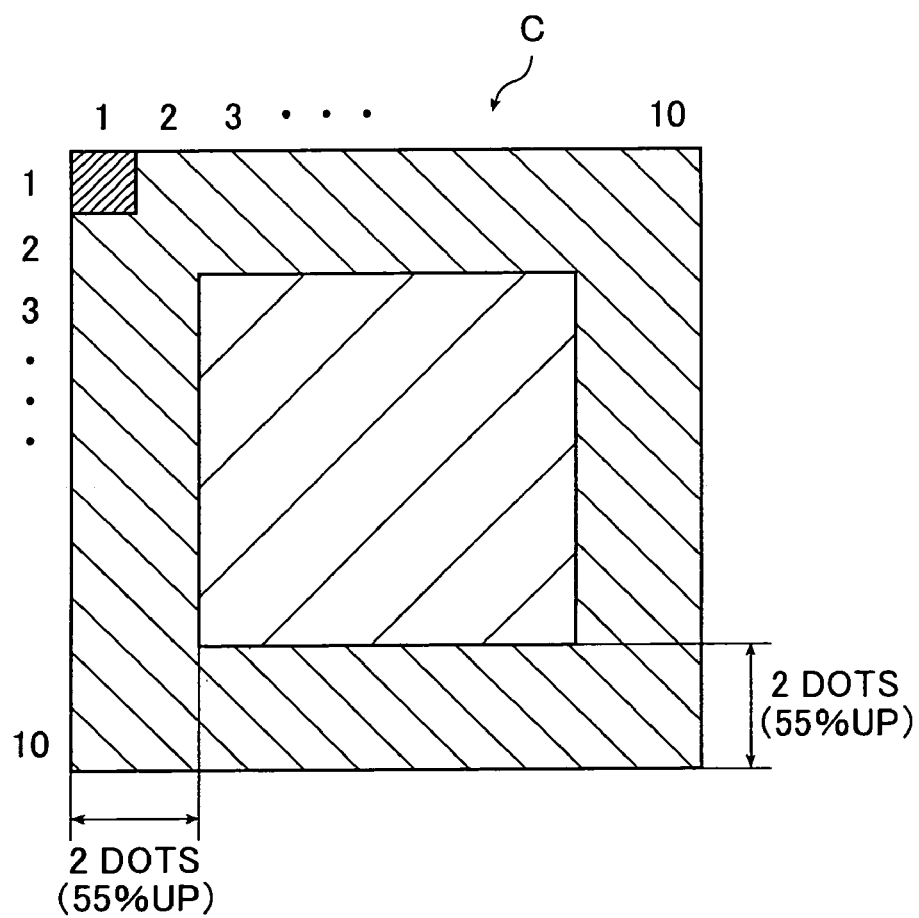

FIGS. 11A and 11B are enlarged explanatory views schematically showing a halftone image of 175 lines/in, 45°, 50% as an example. FIG. 11A is a view showing plural halftones of this case, and FIG. 11B is a view showing one halftone among them (e.g., a halftone C in the center of FIG. 11A) in a further enlarged form. Note that, here, one halftone is constituted by arranging ten square dots (pixels) whose one side is 10 μm in longitudinal and lateral directions, respectively.

In FIG. 11A, an arrow "a" indicates a main scanning direction (here, a direction opposite to a rotating direction of the rotary drum 12), C indicates one of halftones, C1 and C2 denote main scanning edges of the halftone C, and D1 and D2 denote sub-scanning edges of the halftone C.

Note that contents of FIG. 11B will be described later.

As a method detecting edges of each halftone in the main scanning edge detector 24 and the sub-scanning edge detector 26, for example, a method of comparing a certain dot (pixel) and dots on both sides thereof and, if the dots on both sides are different, judging that the certain dot corresponds to an edge can be used preferably. However, the present invention is not necessarily limited to this method.

In addition, it is possible to perform the detection of a main scanning position in the main scanning position detector 20 with publicly known rotation angle-detection means. Further, it is possible to perform the detection of a sub-scanning position in the sub-scanning position detector 22 on the basis of a result of moving distance detection by publicly known moving distance detection means. Note that the present invention is not limited to these detection methods.

Figure 24A:
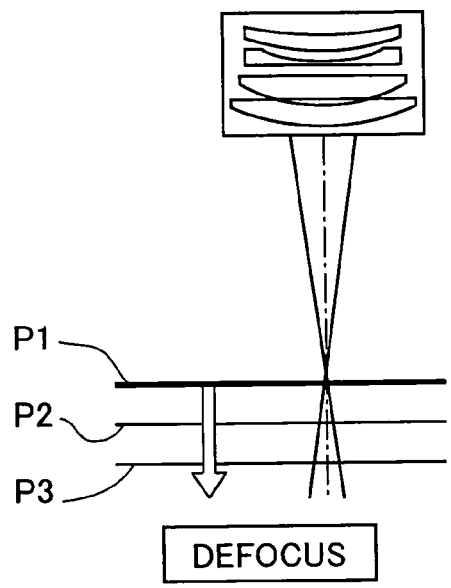
FIG. 24A is a diagram for explaining a position where a recording beam is focused (P1) and a position where defocus occurs.
Figure 24B:
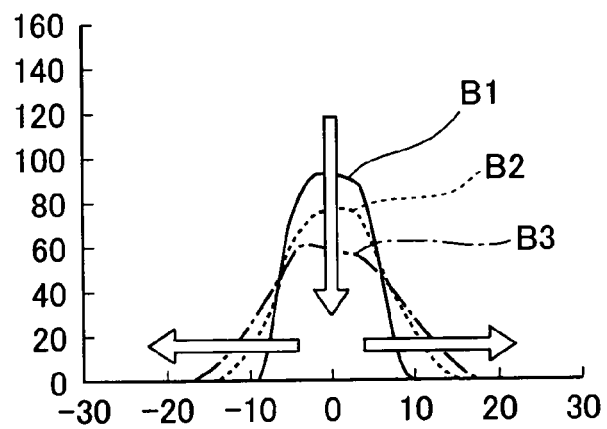
FIG. 24B is a graph showing a state in which a shape of the recording beam changes corresponding to the positions.

Here, an increase in a light quantity based upon a light emission energy increase in halftone formation will be described using FIGS. 12A and 12B. First, as described using FIGS. 24A and 24B, when defocus occurs, a peak value of a light beam falls and a beam diameter is expanded (note that this state is also shown in FIG. 12A). Here, it is understood that, in each beam shape, there is light emission energy with which a sectional diameter at the time when the light beam is cut at a certain energy level is substantially fixed irrespective of defocus.

Thus, when the light emission energy is increased, as shown in FIG. 12B, a position (light emission energy level), where the sectional diameter (beam diameter) is substantially fixed, can be set as a threshold level at which a photosensitive material for recording blackens (this state is indicated by circle Q in FIG. 12B).

In this way, in a state in which the position where the beam diameter is substantially fixed coincides with the threshold level for the photosensitive material to blacken, even if a change occurs in defocus, that is, even if a beam shape changes in a range shown in the figure, a size of a dot, which is recorded on the photosensitive material at the threshold level for the photosensitive material to blacken, never changes. That is, the influence of defocus as described above hardly occurs.

This relation is described in detail for the case of a positive photosensitive material in FIG. 13. FIG. 13 indicates a relation between a defocus amount (shown on the horizontal axis in FIG. 13: $\Delta z$) and a magnitude of a change in a line width of a halftone caused by the defocus (shown on the vertical axis in FIG. 13: mesh % Sc). A parameter is a light emission energy level represented by the above-mentioned standardized power.

As it is seen from FIG. 13, even if the defocus amount increases to some extent as the light emission energy level rises, it is possible to reduce an influence therefrom (i.e., the change in a line width of a halftone) to a negligible degree. Since an actual defocus amount is suppressed to about ±20 μm, when the light emission energy is increased by approximately 50% from that in the prior art, the change in a line width of a halftone can be reduced to a negligible degree.

The inventors of the present invention have empirically found from FIGS. 12A and 12B that the light quantity level at which the intensity level of from 40% to 60% of the peak intensity is substantially equal to the threshold value for the photosensitive material is appropriate. As is seen from the graph shown in FIG. 13, the optimal light quantity level is approximately twice as high as the reference light quantity level.

Therefore, it is preferable that the power of the light beam at best focus is of a level at which an intensity level of from 40% to 60% of a peak intensity of said light beam is substantially equal to the threshold value for the photosensitive material to blacken. Moreover, it is preferable that the power of the light beam is 1.8 to 2.2 times a reference exposure power.

Here, the increase in the light emission energy causes a problem not only in that energy consumption increases but also in that occurrence of the abrasion increases. However, as shown in FIGS. 14A and 14B, if the light emission energy is increased only for edge parts of halftones, occurrence of the abrasion can be suppressed while maintaining the effect of reducing the change in a line width of a halftone due to defocus to a negligible degree.

Figure 14A:
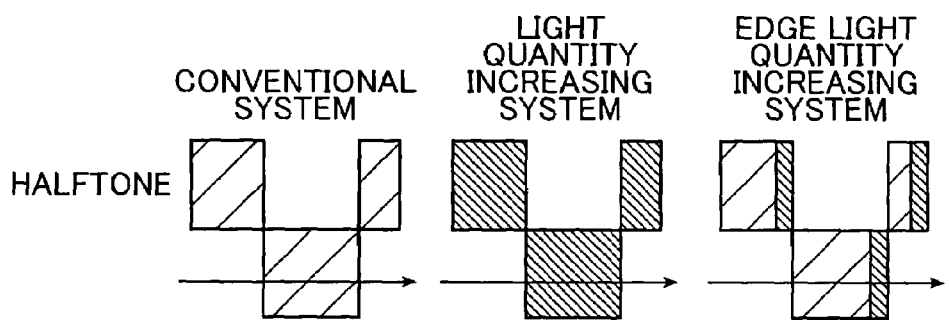
Figure 14B:
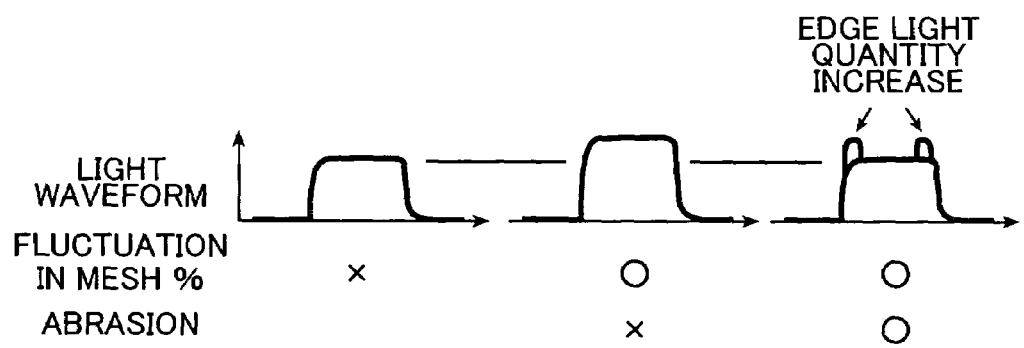

That is, as shown in FIG. 14A, it is conceivable that, although occurrence of the abrasion increases and an evaluation for a degree of occurrence of the abrasion is "x" in the case in which the light emission energy level is simply increased, the evaluation for a degree of occurrence of the abrasion is improved to "O" and a practically sufficient performance is obtained in the case in which the light emission energy level is increased only for the edge parts. In addition, a pattern of energy supply at this point is schematically shown in FIG. 14B. As it is understood from this, supplied energy can be suppressed to the same degree as in the conventional system (a state in which energy is not increased).

Figure 15:
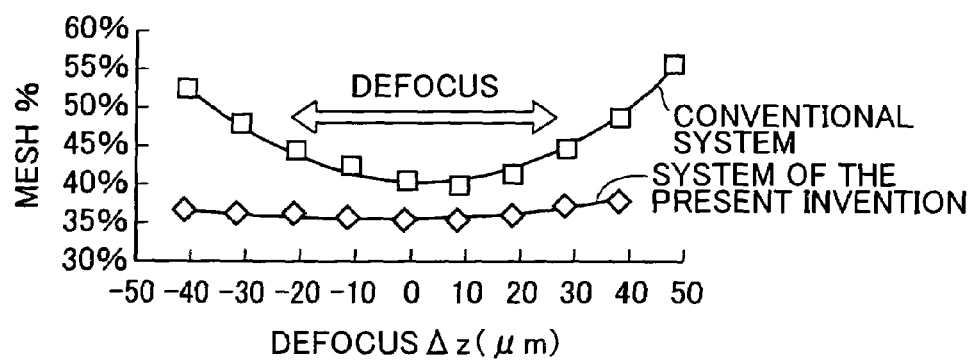
FIG. 15 is a graph showing a comparative example of a relation between an amount of defocus and an amount of change in mesh % according to presence or absence of an increase in an edge light quantity.

FIG. 15 shows a state of a change in mesh % in the case in which the light emission energy level is increased only at edge parts of halftones as described above. A change in mesh is about 3.5 and is relatively unstable in the conventional system (a state in which the energy level is not increased), whereas the change in mesh % is significantly improved to 1% or less in the case in which the light emission energy only at the edge parts is increased.

The case in which the light emission energy level is increased only in the edge parts of the halftones will be described in detail using FIG. 1B.

In the halftone C shown in FIG. 11B, the light emission energy level is increased at edge parts in a width of two dots of a total width of ten dots for all four sides (main scanning edges and sub-scanning edges). Namely, it is preferable that a length of the edge part of the recorded image at which the light emission energy level is increased corresponds to 0.5 to 4 pixels.

Here, as an example, the light emission energy level of the edge parts is increased by 55% from the internal light emission energy level (i.e., 1.55 times the internal light emission energy level). However, this is only an example and does not limit the present invention.

In addition, although the width of edges is set to two dots as described above, the present invention is not limited to this either. Note that such actuality of the control for an increase in a light quantity is as described in the outline of operations.

Figure 16:
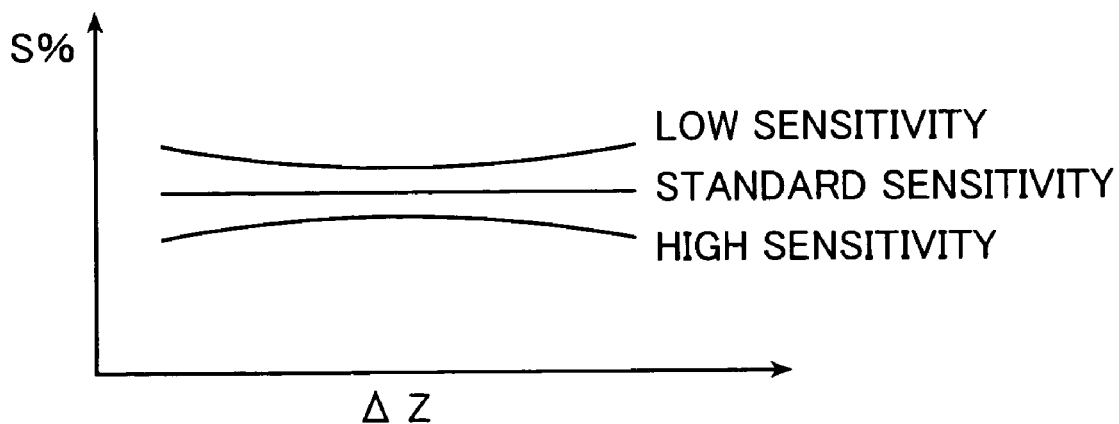
FIG. 16 is a graph schematically showing an influence of fluctuation in sensitivity due to a photosensitive material or a processing system (change in mesh %) in the embodiment of the second aspect of the present invention.

Next, actions of the present invention with respect to the problem of fluctuation in sensitivity due to a processing system will be described. In the case in which the light emission energy level at edge parts is increased as described above, in the present invention, as schematically shown in FIG. 16, it has been confirmed that a photosensitive material of standard sensitivity is not affected by defocus at all. In the case of a photosensitive material of low sensitivity and a photosensitive material of high sensitivity, fluctuation in mesh % only occurs slightly although directions of change are opposite, and the fluctuation is substantially minimized to a degree not requiring correction.

Figure 17:
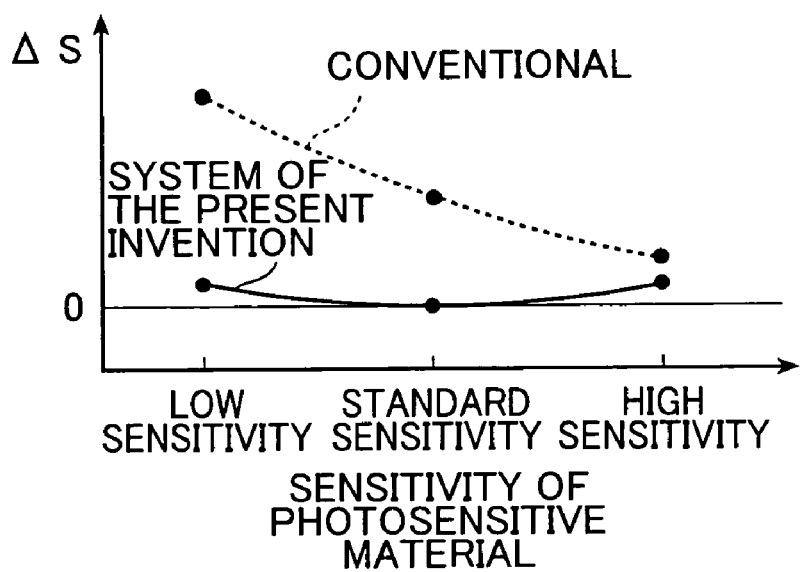
FIG. 17 is diagram collectively showing contents shown in FIG. 25 and the contents shown in FIG. 16 for comparison.
Figure 25:
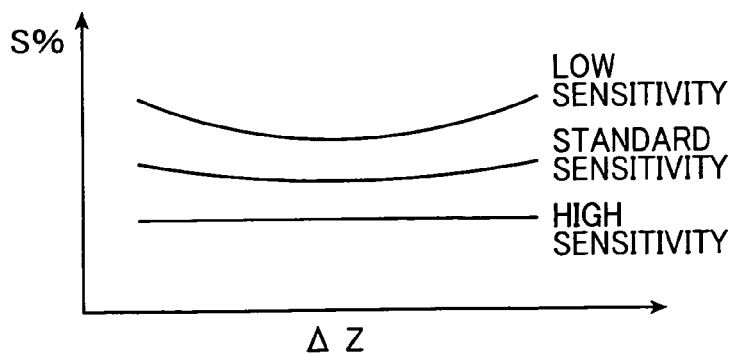
FIG. 25 is a graph schematically showing an influence of fluctuation in sensitivity (change in mesh %) due to a photosensitive material or a processing system.

The above-mentioned contents of FIG. 25 and the contents of FIG. 16 are collectively represented in FIG. 17 with sensitivity of a photosensitive material plotted on the horizontal axis. FIG. 17 indicates that fluctuation in mesh % is generally large and, in particular, the fluctuation tends to depend upon sensitivity of a photosensitive material in the conventional system, whereas, in the system of the present invention, dependency on sensitivity of a photosensitive material is decreased to a substantially negligible degree.

According to the above-mentioned embodiment, power of a recording beam is increased to a level, at which a recording line width or a recording dot size depending upon a threshold value of a photosensitive material to blacken is substantially fixed even in the case in which defocus occurs. Consequently, there is an effect that it becomes possible to minimize influence of defocus, and an image forming method and an image forming apparatus can be realized which make it possible to maintain a stable image quality with respect to fluctuation in sensitivity due to a photosensitive material or a processing system.

In addition, since the increase in power is caused only at edge parts of a halftone, there is an effect that an image forming method and an image forming apparatus can be realized which make it possible to prevent the abrasion and maintain a stable image quality while suppressing an increase in energy consumption. In addition, there are various other effects as described above.

As described above in detail, according to the second aspect of the present invention, there is a remarkable effect that it becomes possible to minimize influence of defocus and it becomes possible to realize an image forming method and an image forming apparatus which enable stable image quality to be maintained with respect to fluctuation in sensitivity due to a photosensitive material or a processing system.

The image forming method and the image forming apparatus of the second aspect of the present invention are basically constituted as described above.

Next, an image forming method and an image forming apparatus of a third aspect of the present invention will be described with reference to FIGS. 18 to 21.

Figure 18:
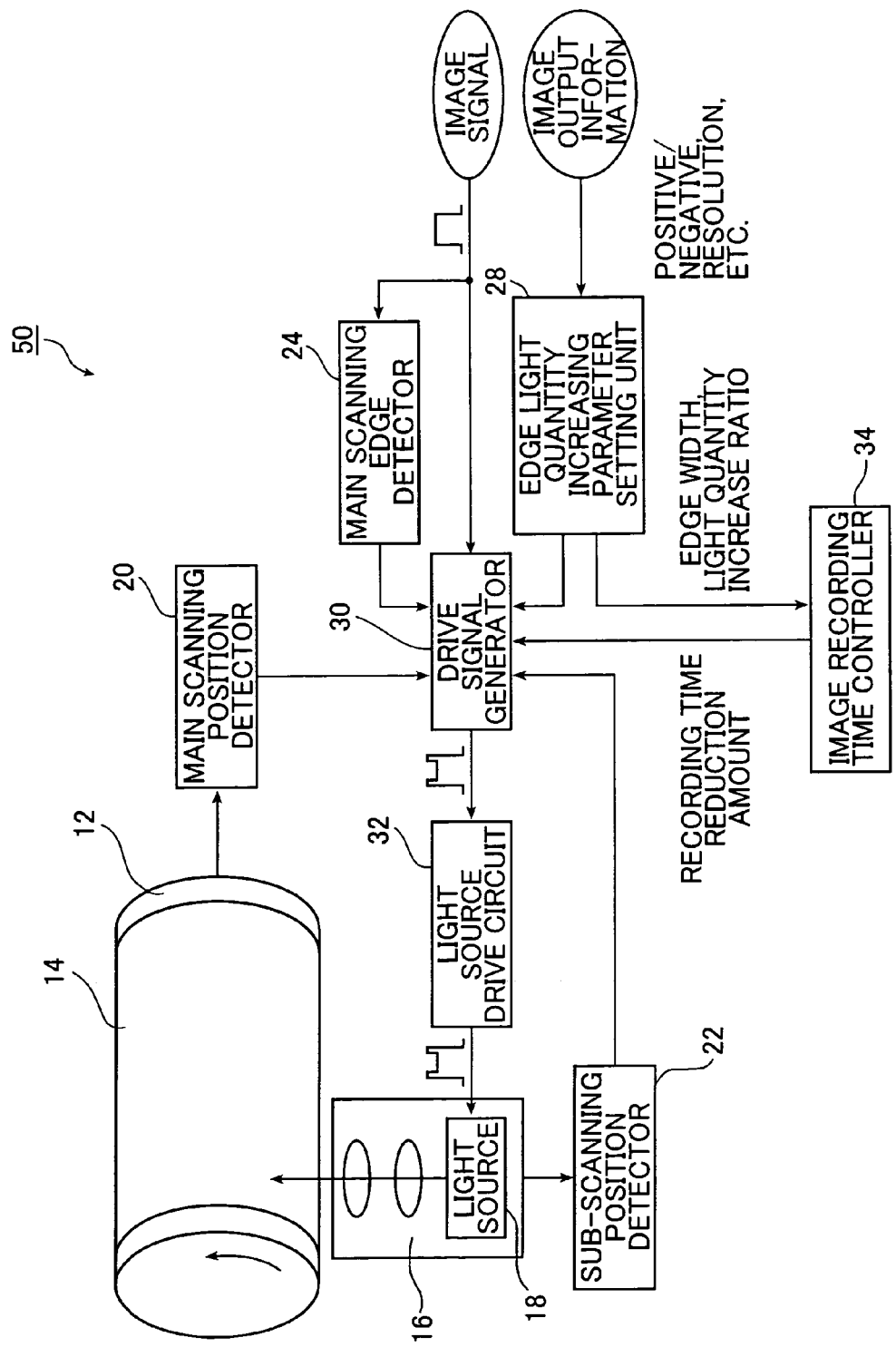
FIG. 18 is a block diagram showing a schematic structure of an image forming apparatus which implements an image forming method in accordance with an embodiment of a third aspect of the present invention.

FIG. 18 is a block diagram showing a schematic structure of an image forming apparatus implementing an image forming method in accordance with an embodiment of a third aspect of the present invention.

An image forming apparatus 50 of this embodiment shown in FIG. 18 basically has the same structure as the image forming apparatus 10 shown in FIG. 10 except that it is provided with an image recording time controller 34 instead of the sub-scanning edge detector 26. Thus, the identical components are denoted by the identical reference numerals, and a detailed description of the components will be omitted. Note that, the image forming apparatus 50 is shown with an exposure machine as a main component thereof. However, as in the image forming apparatus 10, the image forming apparatus 50 such as a development processing machine incorporates: the rotary drum 12, which is mounted with and supports the photosensitive material 14 around an external circumference thereof as a mechanical drawing system; and the light source for exposure 18, and is also is provided with the sub-scanning unit 16 which is movable along an axial direction of the rotary drum 12.

In addition, the image forming apparatus 50 of this embodiment has a main scanning position detector 20, a sub-scanning position detector 22, a main scanning edge detector 24, a parameter setting unit 28 (for increasing an edge light quantity), an image recording time controller 34, a drive signal generator 30, and a light source drive circuit 32 as a control system thereof.

In addition, the image recording time controller 34 controls an image recording time on the basis of an output signal of the parameter setting unit 28. The drive signal generator 30 outputs a signal for controlling the light source drive circuit 32, which outputs a control signal for driving the light source 18, on the basis of various detection signals and setting information from the above-mentioned respective detectors and setting units (the main scanning position detector 20, the sub-scanning position detector 22, the main scanning edge detector 24, the parameter setting unit 28, and the image recording time controller 34).

In the image forming apparatus 50 in accordance with this embodiment constituted as described above, edges in the main scanning direction are detected from an inputted image signal by the main scanning edge detector 24, and parameters for increase in an edge light quantity are set on the basis of image output information by the parameter setting unit 28, and these pieces of information are further sent to the drive signal generator 30.

The drive signal generator 30 sends an instruction such that a light quantity in a predetermined length (width) is increased, that is, light emission intensity is increased for edge parts of halftones forming an image on the basis of these pieces of information and position detection information from the main scanning position detector 20 and the sub-scanning position detector 22.

Details of the above description will be hereinafter described.

Figure 19A:
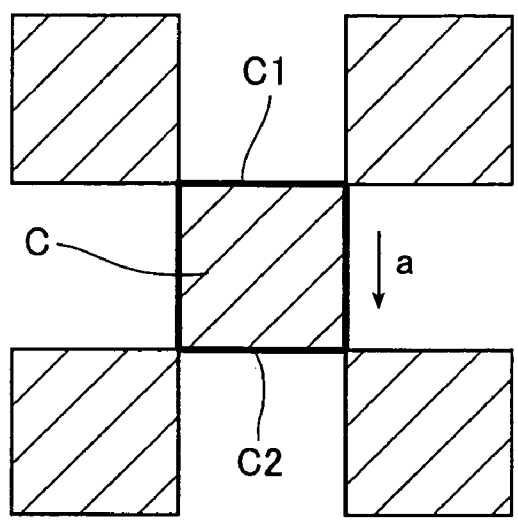
Figure 19B:
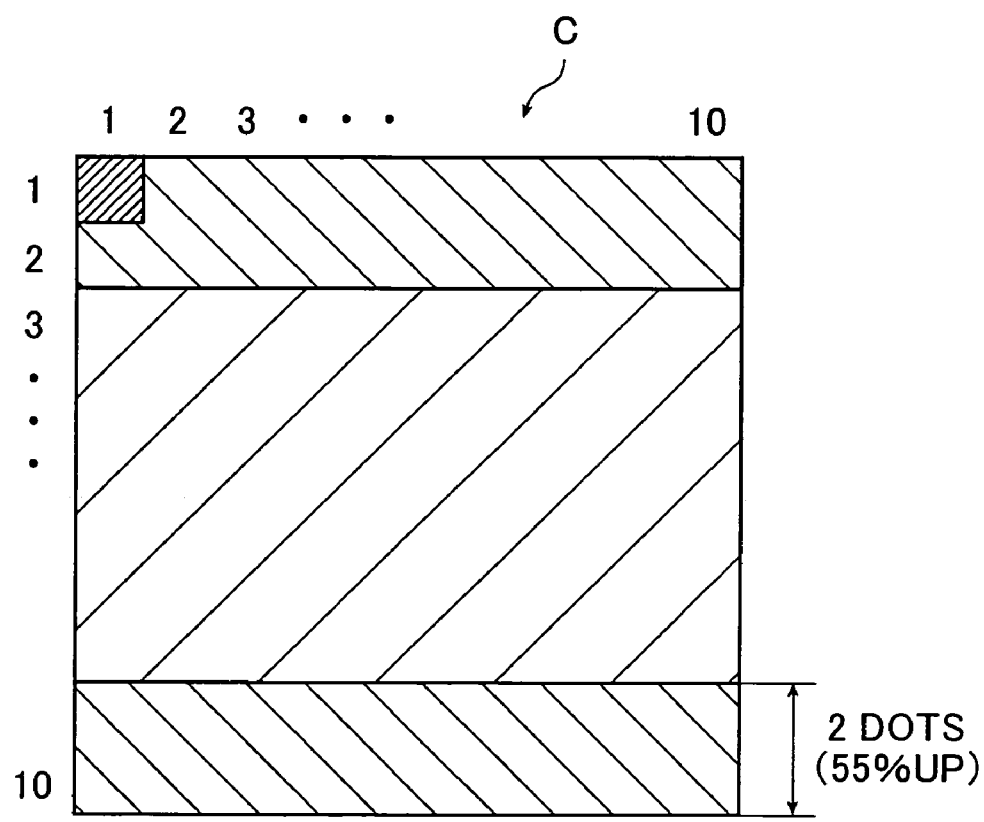

FIGS. 19A and 19B are enlarged explanatory views schematically showing a halftone image of 175 lines/in, 45°, 50% as an example. FIG. 19A is a view showing plural halftones of this case, and FIG. 19B is a view showing one halftone among them (e.g., a halftone C in the center of FIG. 19A) in a further enlarged form. Note that, here, one halftone is constituted by arranging ten square dots (pixels) whose one side is 10 μm in longitudinal and lateral directions, respectively.

In FIG. 19A, an arrow "a" indicates a main scanning direction (here, a direction opposite to a rotating direction of the rotary drum 12), C indicates one of halftones, and C1 and C2 denote main scanning edges of the halftone C. Note that, in this embodiment, since only detection of main scanning edges is performed and detection of sub-scanning edges is not performed, the sub-scanning edges are not shown in FIGS. 19A and 19B unlike FIGS. 2A and 2B.

Note that contents of FIG. 19B will be described later.

Note that detection of edges of halftones in the main scanning edge detector 24 and detection of a main scanning position and a sub-scanning position in the main scanning position detector 20 and the sub-scanning position detector 22 according to this embodiment only have to be performed in the same manner as the image forming apparatus 10 of the embodiment of the second aspect of the present invention shown in FIG. 10. Therefore, a description of the detections will be omitted.

In addition, as in the embodiment of the second aspect, this embodiment applies the system of the present invention for increasing a light emission energy level only for edge parts of halftones to increase a light quantity of the edge parts and suppressing occurrence of the abrasion while keeping a change in a line width of the halftones due to defocus at a negligible degree. Thus, since the relation among the conventional system of a state in which the change in a line width of halftones due to defocus cannot be neglected and an energy level is not increased, the overall light quantity increasing system in which the change in a line width of halftones due to defocus can be reduced to a negligible degree but the abrasion occurs, and the edge light quantity increasing system of the present invention (see FIGS. 12A to 15) has already been described, a description thereof will be omitted here.

The above-mentioned case of increasing a light emission energy level only at edge parts of halftones will be described in detail using FIG. 19B.

In the halftone C shown in FIG. 19B, a light emission energy level at edge parts is increased in a width of two dots of a total with of ten dots for upper and lower two sides (i.e., main scanning edges).

Here, the light emission energy level of the edge parts is also increased by 55% from the internal light emission energy level (i.e., 1.55 times the internal light emission energy level), and a width of edges is set to two dots. However, it is needless to mention that these are only examples, and the present invention is not limited to them.

In addition, such actuality of the control for an increase in a light quantity is as described in the outline of operations.

Incidentally, when the case in which a light emission energy level is increased only in main scanning edges of halftone as described above is examined in detail, it is found that a phenomenon occurs in which line widths of a vertical line and a horizontal line slightly differ.

This phenomenon is usually a slight one in a degree not causing a problem. However, in forming an image of extremely high definition, the phenomenon is likely to be a problem.

Measures to cope with the phenomenon will be hereinafter described in detail.

Figure 20A:
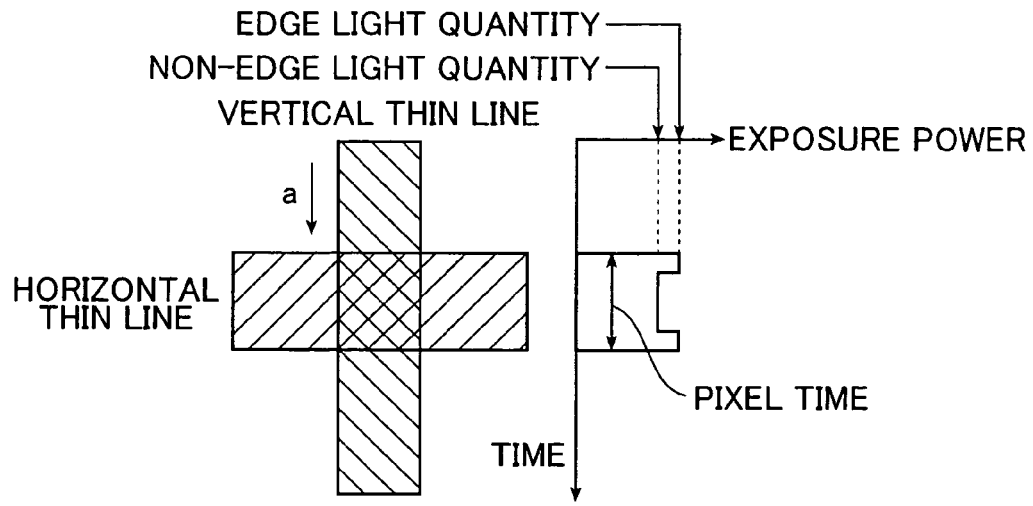
FIG. 20A is a diagram for explaining problems of an increase in an edge light quantity.
Figure 20B:
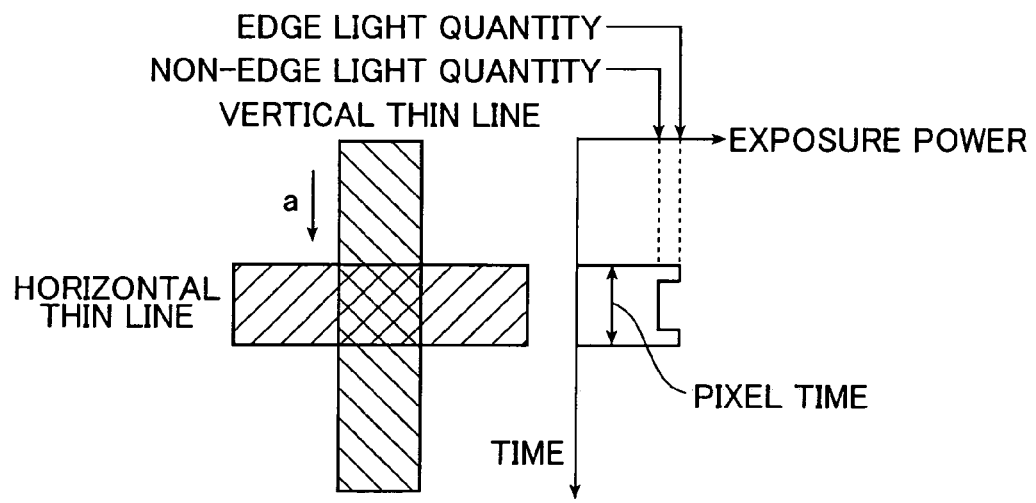
FIG. 20B is a diagram for explaining measures to cope with the problems.

FIGS. 20A and 20B are diagrams for explaining a change in line widths of a vertical thin line and a horizontal thin line that constitute a thin line image. In the figure, a segment in a vertical direction indicates the vertical thin line and a segment in a horizontal direction indicates the horizontal thin line. Note that FIG. 20A is a diagram showing a change in a line width (here, an increase in a line width) of the horizontal thin line including main scanning edges, which occurs in the case in which a light emission energy is increased only at main scanning edges of halftones. In addition, FIG. 20B is a diagram showing a state after correction of the change. Note that an arrow "a" in the figure indicates a main scanning direction.

A diagram on the left of FIG. 20A indicates that the horizontal thin line including main scanning edges is recorded at a high energy level by the increase in a light emission level, as a result of which, when the horizontal thin line is compared with the vertical thin line recorded at a usual energy level, a horizontal white thin line is widened in a positive photosensitive material, and a horizontal black thin line is widened in a negative photosensitive material. In addition, a graph on the right shows details of pixel time causing the widening of the thin lines.

That is, for example, in the case of a halftone formed of 10 dots on one side, recording is performed with a recording power increased to a high power in parts corresponding to edge parts (main scanning edges) and a recording power remained at a lower power (usual power) in parts between the edge parts (i.e., non-edge parts). In the case in which recording is performed with such exposure power, a phenomenon occurs in which expansion of a recording dot diameter occurs in the edge parts where recording is performed with the high power, and a recording line width is expanded accordingly.

Thus, in the image forming apparatus 50 in accordance with this embodiment, a recording time of the horizontal thin line (i.e., a light emission time of a recording beam) is controlled by the image recording time controller 34, which controls an image recording time on the basis of an output signal of the parameter setting unit 28, to suppress the phenomenon that a recording line width expands.

More specifically, the phenomenon is suppressed as described below.

(1) A Case of a Positive Photosensitive Material:

Exposure power of non-edge parts is set to 1.8 times of clear power, and exposure power of edge parts is set to 2.8 times of clear power, and an image recording time (pixel time in FIGS. 20A and 20B) is reduced by 5/16 pixels. Consequently, the thickening of a recording line width of a horizontal thin line is eliminated, both the vertical thin line and the horizontal thin line are recorded in an identical line width, and reproducibility of a thin line is improved.

(2) A Case of a Negative Photosensitive Material:

Exposure power of non-edge parts is set to 1.3 times of shoulder power, and exposure power of edge parts is set to 2.0 times of the shoulder power, and an image recording time (pixel time in FIGS. 20A and 20B) is reduced by 5/16 pixels. Consequently, the thickening of a recording line width of a horizontal thin line is eliminated, both the vertical thin line and the horizontal thin line are recorded in an identical line width, and reproducibility of a thin line is improved.

FIG. 20B schematically shows an effect according to the reduction in an image recording time. As it is evident when the figure is compared with FIG. 20A that the thickening of a horizontal thin line is eliminated by reducing the pixel time.

Figure 21:
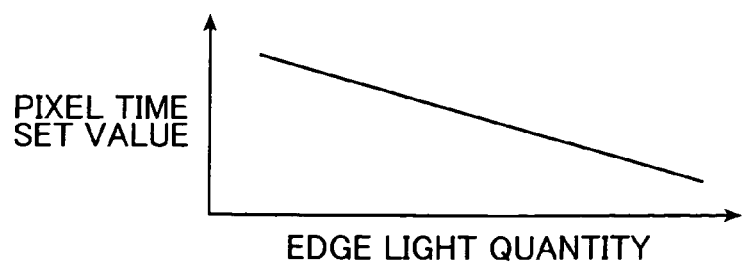
FIG. 21 is a graph schematically showing a concept of a change in a set value of pixel time according to an increase in an edge light quantity.

Note that FIG. 21 schematically shows a concept of changing the pixel time according to an increase in an edge light quantity.

Note that, concerning the action of the present invention with respect to the problem of fluctuation in sensitivity due to the processing system described above, this aspect is substantially the same as the second aspect, a description of the action (see FIGS. 16 and 17) will be omitted.

Next, actions and effects of the present invention with respect to the problem of fluctuation in sensitivity due to a processing system will be described.

In the case in which the light emission energy level at edge parts is increased as described above, also in this embodiment, as schematically shown in FIG. 16, it has been confirmed that a photosensitive material of standard sensitivity is not affected by defocus at all. In the case of a photosensitive material of low sensitivity and a photosensitive material of high sensitivity, fluctuation in mesh % only occurs slightly although directions of change are opposite, and the fluctuation is substantially minimized to a degree not requiring correction.

The contents described above and the contents of FIG. 16 are collectively represented in FIG. 17 with sensitivity of a photosensitive material plotted on the horizontal axis. FIG. 17 indicates that fluctuation in mesh % is generally large and, in particular, the fluctuation tends to depend upon sensitivity of a photosensitive material in the conventional system, whereas, in the system of the present invention, dependency on sensitivity of a photosensitive material is decreased to a substantially negligible degree.

According to this embodiment, a recording beam is increased to power of a level at which a recording line width or a recording dot size, which depends upon a threshold value for a photosensitive material to blacken, is substantially fixed even if defocus occurs, and a recording time for an image to be recorded is controlled according to power of a light beam. Consequently, there is an excellent effect that it becomes possible to minimize influence of defocus, and it becomes possible to make line widths of vertical and horizontal thin lines coincide with each other even in the case in which an image of a high definition is formed. Further, there is also an effect that an image forming method and an image forming apparatus can be realized which makes it possible to maintain a high image quality with respect to fluctuation in sensitivity due to a photosensitive material or a processing system.

In addition, since the increase in power is caused only at edge parts of halftones as described above, there is an effect that an image forming method and an image forming apparatus can be realized which makes it possible to prevent the abrasion and maintain a stable image quality while suppressing an increase in energy consumption. Further, there are various other effects as described above.

As described above in detail, according to the third aspect of the present invention, there is a remarkable effect that it becomes possible to minimize influence of defocus and it becomes possible to make line widths of vertical and horizontal thin lines coincide with each other even in the case in which an image of a high definition is formed. Further, there is also an effect that it becomes possible to realize an image forming method and an image forming apparatus which enable stable image quality to be maintained with respect to fluctuation in sensitivity due to a photosensitive material or a processing system.

The image forming method and the image forming apparatus of the third aspect of the present invention is basically constituted as described above.

Next, an image forming method and an image forming apparatus of a forth aspect of the present invention will be described with reference to FIGS. 22 and 23.

Figure 22:
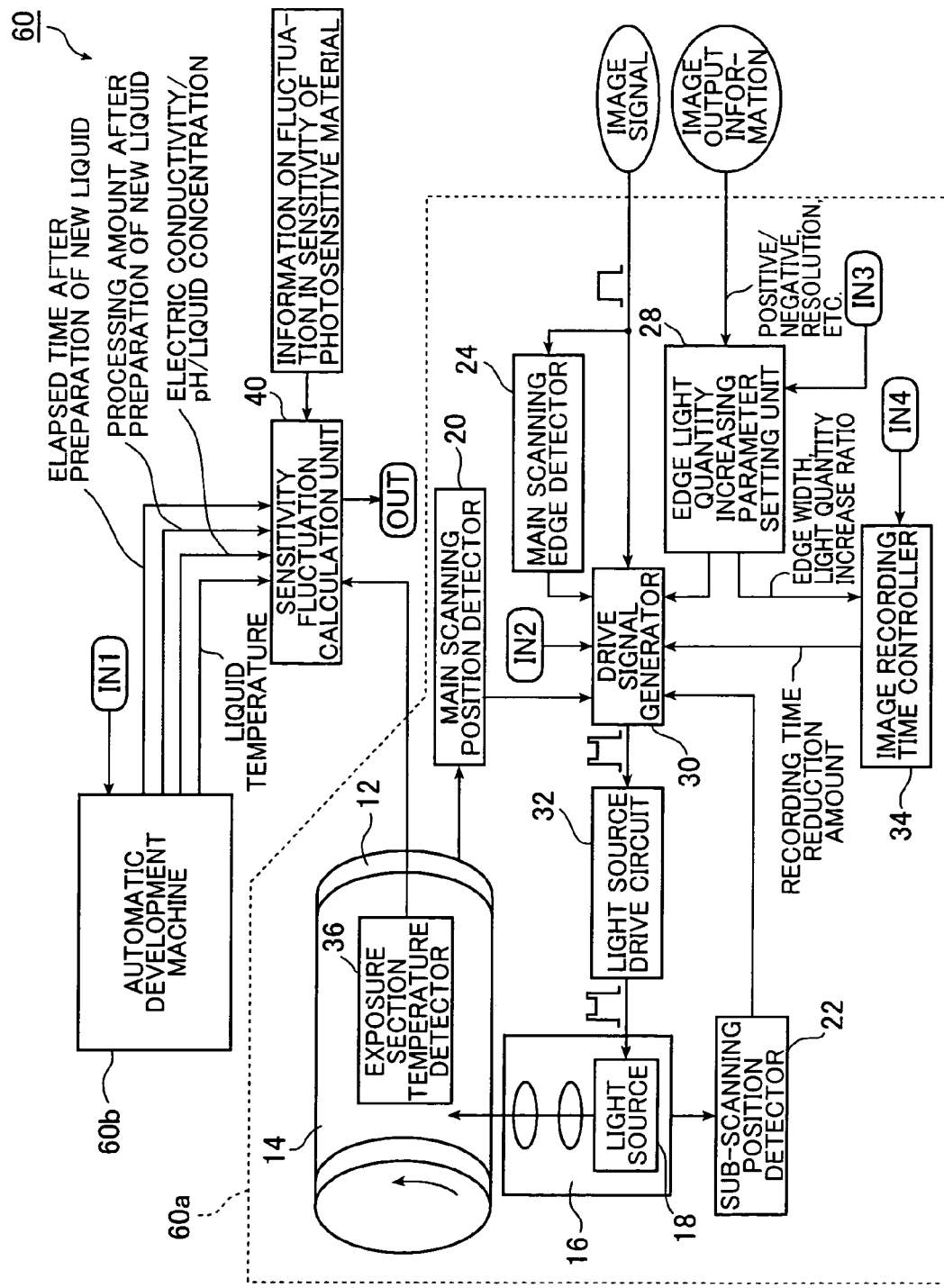
FIG. 22 is a block diagram showing a schematic structure of an image forming apparatus which implements an image forming method in accordance with the embodiment of the third aspect of the present invention.

FIG. 22 is a block diagram showing a schematic structure of an image forming apparatus implementing an image forming method in accordance with an embodiment of a fourth aspect of the present invention.

Note that, an image forming apparatus 60 of this embodiment shown in FIG. 22 basically has the same structure as the image forming apparatus 50 shown in FIG. 18 except that it is provided with an exposure section temperature detector 36, an automatic development machine 60B, and a sensitivity fluctuation calculation unit 40. Thus, the identical components are denoted by the identical reference numerals, and a detailed description of the components will be omitted.

The image forming apparatus 60 includes an exposure machine 60A, an automatic development machine 60B, and a sensitivity fluctuation calculation unit 40. As in (the exposure machine of) the image forming apparatus 50, the exposure machine 60A incorporates the rotary drum 12, which is mounted with and supports the photosensitive material 14 around an external circumference thereof as a mechanical drawing system, and the light source for exposure 18, and is also provided with the sub-scanning unit 16 which is movable along an axial direction of the rotary drum 12.

In addition, the image forming apparatus 60 of this embodiment has a main scanning position detector 20, a sub-scanning position detector 22, a main scanning edge detector 24, an edge light quantity increasing parameter setting unit 28, a drive signal generator 30, a light source drive circuit 32, an image recording time controller 34, and an exposure section temperature detector 36 as a control system thereof.

Note that, in the image forming apparatus 60 of this embodiment, the parameter setting unit 28 sets parameters for reinforcing an edge light quantity, that is, parameters for increasing (UP) an edge light quantity, on the basis of image output information incidental to the image signal and information on fluctuation in sensitivity (IN3) sent from the sensitivity fluctuation calculation unit 40.

In addition, the image recording time controller 34 controls an image recording time on the basis of an output signal of the parameter setting unit 28 and information on fluctuation in sensitivity (IN4) sent from the sensitivity fluctuation calculation unit 40. The drive signal generator 30 outputs a signal for controlling the light source drive circuit 32, which outputs a control signal for driving the light source 18, on the basis of various detection signals and setting information from the above-mentioned respective detectors and setting units (the main scanning position detector 20, the sub-scanning position detector 22, the main scanning edge detector 24, the parameter setting unit 28, and the image recording time controller 34) and information on fluctuation in sensitivity (IN2) sent from the sensitivity fluctuation calculation unit 40.

In addition, the exposure section temperature detector 36 is embedded in the surface of the rotary drum 12, and an output of the exposure section temperature detector 36 is sent to the sensitivity fluctuation calculation unit 40, which calculates contents of correction for fluctuation in sensitivity, on the basis of characteristics of a processing system in the exposure machine 60A and the automatic development machine 60B (details will be described later), characteristics of the photosensitive material 14, and the like.

In addition, in FIG. 22, the automatic development machine 60B subjects the photosensitive material 14, which is exposed and drawn an image thereon by the exposure machine 60A, to development processing. A main body itself of this automatic development machine is provided with a publicly known physical phenomenon function (e.g., a type of brush use). However, the main body of the automatic development machine 60B is provided with, as an additional function, a function of detecting various characteristics such as electric conductivity/pH/liquid concentration, a liquid temperature, an elapsed time after preparing a new liquid, and amount of processing of a photosensitive material after preparing the new liquid.

On the other hand, the sensitivity fluctuation calculation unit 40 has a function of calculating an effective condition change measure on the basis of information on fluctuation in sensitivity obtained by performing density measurement of a sample (the photosensitive material 14 exposed to light to have a standard image pattern formed thereon and subjected to development processing), which is manufactured by using the exposure machine 60A and the automatic development machine 60B in accordance with this embodiment, and on the basis of detection results of various characteristics sent from the respective detecting function units (the main scanning position detector 20, the sub-scanning position detector 22, and the main scanning edge detector 24) and the exposure section temperature detector 36, and has a function of outputting (OUT) the measure. This output OUT is supplied to the automatic development machine 60B, the drive signal generator 30, the parameter setting unit 28, and the image recording time controller 34 as IN1 to IN4, respectively.

In the image forming apparatus 60 in accordance with this embodiment constituted as described above, edges in the main scanning direction are detected from an inputted image signal by the main scanning edge detector 24, and parameters for increase in an edge light quantity are set on the basis of image output information and the information on fluctuation in sensitivity (IN3 mentioned above) by the parameter setting unit 28, and these pieces of information are sent to the drive signal generator 30 and the image recording time controller 34.

The image recording time controller 34 performs an action of controlling an image recording time as will be described below to prevent deterioration of reproducibility of a thin line as required on the basis of these pieces of information and the information on fluctuation in sensitivity (IN4 described above) sent from the sensitivity fluctuation calculation unit 40.

Further, the drive signal generator 30 sends an instruction such that a light quantity in a predetermined length (width) is increased, that is, light emission intensity is increased for edge parts of halftones forming an image on the basis of these pieces of information, position detection information from the main scanning position detector 20 and the sub-scanning position detector 22, and further, the information on fluctuation in sensitivity (IN2 mentioned above) sent from the sensitivity fluctuation calculation unit 40.

Note that, also in this aspect, the edge light quantity increasing system of the present invention, which increases power (light emission energy) only for edge parts of halftones to increase a light quantity of the edge parts (increase in edge light quantity) in the drive signal generator 30 and the light source drive circuit 32, suppresses occurrence of the abrasion while keeping a change in a line width of halftones due to defocus at a negligible degree, and controls an image recording time according to power of a light beam with an image recording time controller to make line widths of vertical and horizontal thin lines in forming a high definition image coincide with each other, is performed on the exposure machine 60A side. However, since the edge light quantity increasing system of the present invention performed on the exposure machine 60A side has been described in detail in the third aspect of the present invention, a description of the system will be omitted here.

In this embodiment, it is intended to realize a more stable high image quality by performing correction for fluctuation in characteristics of an image due to sensitivity fluctuation factors of the processing system on the automatic development machine side as well in addition to the light quantity correction on the side of various exposure machines.

This will be hereinafter described specifically.

FIG. 23 is a diagram in which factors of fluctuation in sensitivity, and detection means and correction means (control target) therefor in a photosensitive material, an exposure machine, and an automatic development machine are arranged.

FIG. 23 indicates that, for example, as factors of fluctuation in sensitivity due to a photosensitive material, fluctuation in sensitivity between lots or in a lot of the photosensitive material, change over time of sensitivity, temperature dependency of sensitivity, and the like are conceivable. As detection means therefor, density measurement of a sample after exposure development or temperature detection of an exposure part at the time of exposure can be used.

Here, since it is evident that there is no correction means for the fluctuation in sensitivity due to a photosensitive material, the correction means is excluded from the following description.

In addition, as factors of fluctuation in sensitivity for an exposure machine, there is temperature dependency of a light quantity detector (so-called light quantity monitor) at the time of exposure, and the exposure section temperature detector 36 is used for this detection. As a measure to cope with the factor, the increase in a light amount only at edge parts and, in addition, control of an image recording time are effective as described above.

Further, factors of fluctuation in sensitivity for an automatic development machine of particular interest here are roughly divided into fluctuation in liquid activity and fluctuation in a development (processing) time. The former is further classified into characteristics such as electric conductivity/pH/liquid concentration, a liquid temperature, an elapsed time after preparing a new liquid, and an amount of photosensitive material processing after preparing a new liquid (the number of treated sheets or a treated area). Moreover, as a detection function therefor, there are detectors of electric conductivity/pH/liquid concentration and a liquid temperature, a time counter, a treated sheet number coefficient multiplier, a detector of width and length of a photosensitive material, and the like.

As correction means for these various characteristics, there are replenishment of a processing liquid (component) or water for electric conductivity/pH/liquid concentration and various temperature control apparatuses for a liquid temperature. In addition, the measure to cope with fluctuation in sensitivity due to electric conductivity/pH/liquid concentration and a liquid temperature is also effective for fluctuation in sensitivity due to an elapsed time after preparing a new liquid and an amount of photosensitive material processing after preparing a new liquid (the number of treated sheets or a treated area).

In addition, with respect to the fluctuation in a development (processing) time, it is preferable to include a detector of a conveyance speed of a photosensitive material, and it is effective to perform adjustment of the conveyance speed to adjust a development time to a desired time on the basis of a result of detection by the detector.

Note that, in FIG. 23, these measures to cope with fluctuation in sensitivity are assumed to be measures to cope with the information on fluctuation in sensitivity (IN1) on the automatic development machine side.

Here, the following description will be supplemented to avoid misunderstanding. The correction of fluctuation in sensitivity in the image forming apparatus 60 in accordance with this embodiment is the same as the conventional control of liquid activity in the automatic development machine in that, in the case in which the fluctuation in sensitivity is caused due to fluctuation in liquid activity, the fluctuation in sensitivity is coped with by replenishment of a processing liquid or water or correction of a liquid temperature as described above. However, the correction in this embodiment is significantly different from the conventional control of liquid activity in the automatic development machine in that a target value of liquid activity is changed by a degree sufficient for eliminating the fluctuation in sensitivity, whereas the target value is a value decided in advance in the conventional control of liquid activity in the automatic development machine.

That is, the conventional control of liquid activity in the automatic development machine basically places first priority on maintaining an expected setting performance, and is on the premise that, in the case in which some change occurs in an output medium (fluctuation in sensitivity in this context), the change is coped with by steps up to an exposure step in a precedent stage (more specifically, change of an exposure amount, etc. is performed), and liquid activity of the automatic development machine is not changed.

Naturally, the conventional control system of the automatic development machine has a significance of simplifying factors of fluctuation and making it easy to take measures reliably. However, there is limitation in a control range of exposure power of the exposure machine, and in particular, a high power side relies upon power of a light source and has a limit.

Thus, in this embodiment, as described above, fluctuation in sensitivity due to a photosensitive material or processing, which cannot be completely eliminated by the method such as a change in an exposure amount, is corrected by a change in liquid activity in the automatic development machine.

That is, it can be said that the image forming method in accordance with the present invention is characterized by making it possible to adopt a method of coping with fluctuation in sensitivity in two stages for primarily coping with it with an exposure system in order to expand a range of measures with respect to fluctuation in sensitivity and, if this is insufficient, executing a measure with a processing system. Naturally, these methods of coping with fluctuation in sensitivity have various options, respectively, and it is possible to select one or more of them.

That is, according to this embodiment, a recording beam is increased to power of a level at which a recording line width or a recording dot size, which depends upon a threshold value for a photosensitive material to blacken, is substantially fixed even if defocus occurs, and a recording time for an image to be recorded is controlled according to power of a light beam. Consequently, there is an effect that it becomes possible to minimize influence of defocus, and it becomes possible to make line widths of vertical and horizontal thin lines coincide with each other even in the case in which an image of a high definition is formed. Further, there is also an effect that an image forming method and an image forming apparatus can be realized which enable high image quality to be maintained with respect to fluctuation in sensitivity due to a photosensitive material or a processing system.

Incidentally, in the above-mentioned embodiment, the case in which feedback is applied to various characteristics of an exposure machine or an automatic development machine on the basis of a result of density measurement of an output sample is described as an example. However, the present invention is not limited to this. For example, it is also very effective to apply feedback to an exposure machine or an automatic development machine according to differences between detected values of various characteristics such as an ambient temperature of a photosensitive material at the time of exposure, an ambient temperature of a light quantity detector, characteristics of a processing liquid (electric conductivity/pH/liquid concentration, etc.), a processing liquid temperature, an elapsed time/a processing amount after preparing a new processing liquid, and a development processing time, and specified values thereof.

That is, in the image forming method in accordance with the fourth aspect of the present invention, fluctuation in sensitivity in image formation is detected by measuring a density (or mesh %) of a finished image and comparing it with a reference value thereof, or detecting one of characteristic values for the exposure or development processing and comparing it with a reference value thereof, and the fluctuation in sensitivity is corrected by controlling conditions for the exposure or development processing with respect to the fluctuation in sensitivity. Therefore, there is an effect that a correction capability and correction accuracy far wider than those in the prior art can be obtained.

In addition, as another embodiment, there is a method of detecting a control amount, which is determined on the basis of a measurement result of a density (mesh %) of a sample subjected to exposure/development processing, or characteristics for the exposure/development processing, and using the control amount, which is determined on the basis of the result, in correction of fluctuation in sensitivity after that as a new set value (specified value).

With this method, when conditions to be a basis of various characteristics for the exposure/development processing are changed as the case in which a type or a lot of a photosensitive material, a processing agent or the like is changed, a base of a specified value is changed on the basis of the change. Therefore the method is very effective in view of making subsequent measures efficient.

As described above in detail, according to the fourth aspect of the present invention, there is a remarkable effect that it becomes possible to minimize influence of defocus and it becomes possible to realize an image forming method and an image forming apparatus which enable highly stable image quality to be maintained with respect to fluctuation in sensitivity due to a photosensitive material or a processing system.

The image forming method and the image forming apparatus of the fourth aspect of the present invention are basically constituted as described above.

The image recording apparatus in accordance with the first aspect of the present invention, and the image forming method and the image forming apparatus in accordance with the second to fourth aspects of the present invention have been described in detail with reference to the various embodiments, respectively. However, it is needless to mention that the respective embodiments show examples of the respective aspects, and the present invention should not be limited to these various embodiments but may be changed or improved appropriately within a range not departing from the gist of the present invention.

For example, in the respective embodiments, recording by one light beam is described. However, it is needless to mention that the same actions and effects are also obtained in a system for performing recording using plural light beams.

What is claimed is:

1. An image forming method, comprising:
scanning a photosensitive material with a light beam; and recording an image,
wherein the light beam has a sectional beam diameter that is substantially fixed at a certain power level even if defocus occurs,
wherein the sectional beam diameter expands below said certain power level in accordance with the defocus,
wherein a power of said light beam is adjusted such that said certain power level with which said sectional beam diameter is substantially fixed coincides with a threshold level for said photosensitive material to blacken, and
wherein, at said power of said light beam, a recording line width or a recording dot size, which is determined depending upon said threshold value for said photosensitive material to blacken, is substantially fixed even if the defocus occurs.

2. The image forming method according to claim 1, wherein said power of the light beam at best focus is of a level at which an intensity level of from 40% to 60% of a peak intensity of said light beam is substantially equal to said threshold value for said photosensitive material to blacken.

3. The image forming method according to claim 1, wherein said power of the light beam is 1.8 to 2.2 times a reference exposure power.

4. The image forming method according to claim 1, wherein said power of the light beam is differentiated at an edge part and a non-edge part of a recorded image.

5. The image forming method according to claim 4,
wherein said power of the light beam at said edge part of the recorded image is one of:
said power of the level at which said recording line width or said recording dot size, which is determined depending upon said threshold value for the photosensitive material to blacken is substantially fixed even if the defocus occurs;
a power of a level at which an intensity level of from 40% to 60% of a peak intensity of said light beam is substantially equal to said threshold value for the photosensitive material to blacken; and
a power of from 1.8 to 2.2 times a reference exposure power, and
wherein said power of the light beam at said non-edge part of the recorded image is smaller than said power of the light beam at said edge part of the recorded image.

6. The image forming method according to claim 4, wherein a length of said edge part of the recorded image corresponds to 0.5 to 4 pixels.

7. The image forming method according to claim 4, wherein said edge part of the recorded image is at least one of a side perpendicular to a main scanning direction and a side in said main scanning direction.

8. The image forming method according to claim 4, wherein said edge part of the recorded image is said side perpendicular to the main scanning direction and said side in the main scanning direction.

9. The image forming method according to claim 1, further comprising:
differentiating an exposure power of said light beam at said edge part and said non-edge part perpendicular to said main scanning direction; and
controlling a recording time required for said recorded image according to said differentiated exposure power of the light beam.

10. The image forming method according to claim 9, wherein said power of the light beam at best focus is of a level at which an intensity level of from 40% to 60% of a peak intensity of said light beam is substantially equal to said threshold value for said photosensitive material to blacken.

11. The image forming method according to claim 9, wherein said power of the light beam is 1.8 to 2.2 times a reference exposure power.

12. The image forming method according to claim 9, wherein a length of said edge part of the recorded image corresponds to 0.5 to 4 pixels.

13. The image forming method according to claim 1, further comprising:
differentiating an exposure power of said light beam at exposure said edge part and said non-edge part of the recorded image;
subjecting said photosensitive material to exposure and development processing to form a predetermined pattern thereon, thereby manufacturing a sample;
measuring a density or mesh % of said sample;

calculating a difference between said measured density or mesh % and a specified density or mesh %; and correcting fluctuation in sensitivity due to factors of fluctuation in sensitivity in an exposure and development processing system for said photosensitive material based on said calculated difference.

14. The image forming method according to claim 13, wherein said step of correcting fluctuation in sensitivity includes controlling at least one of; said exposure power of the light beam at said edge part at exposure of said photosensitive material; said exposure power of the light beam at said non-edge part; a length and/or a width of said edge part; an image recording time; a development time or a conveyance speed of said photosensitive material; electric conductivity/pH/liquid concentration of a processing liquid; and a processing liquid temperature.

15. The image forming method according to claim 13, further comprising:

controlling a recording time required for said recorded image in accordance with said exposure power of the light beam differentiated at said edge part and said non-edge part of the recorded image.

16. The image forming method according to claim 15, wherein said step of correcting fluctuation in sensitivity includes adjusting at least one of: said exposure power of the light beam at said edge part at exposure of said photosensitive material; said exposure power of the light beam at said non-edge part; a length and/or a width of said edge part; said recording time; a development time or a conveyance speed of said photosensitive material; electric conductivity/pH/liquid concentration of a processing liquid; and a processing liquid temperature.

17. The image forming method according to claim 13, wherein said power of the light beam at best focus is of a level at which an intensity level of from 40% to 60% of a peak intensity of said light beam is substantially equal to said threshold value for said photosensitive material to blacken.

18. The image forming method according to claim 13, wherein said power of the light beam is 1.8 to 2.2 times a reference exposure power.

19. The image forming method according to claim 1, further comprising:

differentiating an exposure power of said light beam at exposure said edge part and said non-edge part of the recorded image;

detecting characteristics for exposure/development processing of said photosensitive material:

comparing detected values with respective specified values to calculate a difference; and correcting fluctuation in sensitivity due to factors of fluctuation in sensitivity in an exposure/development processing system for said photosensitive material based on said calculated difference.

20. The image forming method according to claim 19, wherein said characteristics are at least one of: an ambient temperature of said photosensitive material at exposure of said photosensitive material; an ambient temperature of a light quantity detector; said exposure power of the light beam at said edge part at exposure of said photosensitive material; said exposure power of the light beam at said non-edge part; a length and/or a width of said edge part; an image recording time; a development time or a conveyance speed of said photosensitive material; electric conductivity/pH/liquid concentration of a processing liquid; an elapsed time or a processing amount of said photosensitive material after preparing a new processing liquid; and a processing liquid temperature, and said step of correcting fluctuation in sensitivity includes controlling at least one of said exposure power of the light beam at said edge part at exposure of said photosensitive material, said exposure power of the light beam at said non-edge part, said length and/or said width of the edge part, said image recording time, said development time or said conveyance speed of the photosensitive material, said electric conductivity/pH/liquid concentration of the processing liquid, and said processing liquid temperature among said characteristics.

21. The image forming method according to claim 19, further comprising:

controlling a recording time required for said recorded image in accordance with said exposure power of the light beam differentiated at said edge part and said non-edge part of the recorded image.

22. The image forming method according to claim 21, wherein said characteristics are at least one of: an ambient temperature of said photosensitive material at exposure of said photosensitive material; an ambient temperature of a light quantity detector; said exposure power of the light beam at said edge part at exposure of said photosensitive material; said exposure power of the light beam at said non-edge part; a length and/or a width of said edge part; said recording time; a development time or a conveyance speed of said photosensitive material; electric conductivity/pH/liquid concentration of a processing liquid; an elapsed time or a processing amount of said photosensitive material after preparing a new processing liquid; and a processing liquid temperature, and said step of correcting fluctuation in sensitivity includes adjusting at least one of said exposure power of the light beam at said edge part at exposure of said photosensitive material, said exposure power of the light beam at said non-edge part, said length and/or said width of the edge part, said recording time, said development time or said conveyance speed of the photosensitive material, said electric conductivity/pH/liquid concentration of the processing liquid, and said processing liquid temperature among said characteristics.

23. The image forming method according to claim 1, comprising:

differentiating an exposure power of said light beam at exposure at said edge part and said non-edge part of the recorded image;

subjecting said photosensitive material to exposure/development processing to form a predetermined pattern thereon, thereby manufacturing a sample;

measuring a density or mesh % of said sample;

calculating a first difference between said measured density or mesh % and a specified density or mesh %;

calculating a control amount for correcting fluctuation in sensitivity due to factors of fluctuation in sensitivity in an exposure/development processing system for said photosensitive material based on said calculated first difference;

storing said control amount, which is obtained as a result of said calculation, as a new set value;

detecting characteristics for said exposure/development processing of said photosensitive material;

comparing detected values with respective specified values including said new set value to calculate a second difference;

correcting fluctuation in sensitivity due to factors of fluctuation in sensitivity in the exposure/development processing system for said photosensitive material based on said calculated second difference; and storing a characteristic value, which is used in said correction, as a new set value.

24. The image forming method according to claim 23, wherein said step of calculating a control amount includes calculating a control amount of at least one of: said exposure power of the light beam at said edge part at exposure of said photosensitive material; said exposure power of the light beam at said non-edge part; a length and/or a width of said edge part; an image recording time; a development time or a conveyance speed of said photosensitive material; electric conductivity/pH/liquid concentration of a processing liquid; an elapsed time or a processing amount of said photosensitive material after preparing a new processing liquid; and a processing liquid temperature, and said step of correcting fluctuation in sensitivity includes correcting at least one of: said exposure power of the light beam at said edge part at exposure of said photosensitive material; said exposure power of the light beam at said non-edge part; said length and/or said width of the edge part; said image recording time; said development time or said conveyance speed of the photosensitive material; said electric conductivity/pH/ liquid concentration of said processing liquid; and said elapsed time or said processing amount of the photosensitive material after preparing the new processing liquid.

25. The image forming method according to claim 23, further comprising:

controlling a recording time required for said recorded image in accordance with said exposure power of the light beam differentiated at said edge part and said non-edge part of the recorded image.

26. The image forming method according to claim 25, wherein said step of calculating a control amount includes calculating a control amount of at least one of: said exposure power of the light beam at said edge part at exposure of said photosensitive material; said exposure power of the light beam at said non-edge part; a length and/or a width of said edge part; said recording time; a development time or a conveyance speed of said photosensitive material; electric conductivity/pH/liquid concentration of a processing liquid; an elapsed time or a processing amount of said photosensitive material after preparing a new processing liquid; and a processing liquid temperature, and said step of correcting fluctuation in sensitivity includes adjusting at least one of: said exposure power of the light beam at said edge part at exposure of said photosensitive material; said exposure power of the light beam at said non-edge part; said length and/or said width of the edge part; said recording time; said development time or said conveyance speed of the photosensitive material; said electric conductivity/pH/liquid concentration of said processing liquid; and said elapsed time or said processing amount of the photosensitive material after preparing the new processing liquid.

27. An image forming apparatus for recording an image by scanning a photosensitive material, which is supported by a photosensitive material supporting unit, with a light beam irradiated from a light source, comprising:

a detecting unit which detects at least a part of an edge part of an image signal to be recorded;

a parameter setting unit which sets parameters for processing, which increases a light quantity at an edge part perpendicular to a main scanning direction, based on image output information; and a light source drive signal generation unit which drives said light source based on timing information for image recording, wherein the light beam has a sectional beam diameter that is substantially fixed at a certain power lever level even if defocus occurs, wherein the sectional beam diameter expands below said certain power level in accordance with the defocus, wherein the light source drive signal generation unit is configured to adjust a power of said light beam such that said certain power level with which said sectional beam diameter is substantially fixed coincides with a threshold level for said photosensitive material to blacken.

28. The image forming apparatus according to claim 27, wherein said light source drive signal generation unit applies a power of said light beam to an edge part of a recorded image at which said power of the light beam is differentiated from at a non-edge part of the recorded image, wherein, at said power of said light beam, a recording line width or a recording dot size, which is determined depending upon said threshold value for said photosensitive material to blacken, is substantially fixed even if the defocus occurs, and wherein said edge part of the recorded image is one of: an edge part a length of which corresponds to 0.5 to 4 pixels and an edge part being at least one of a side perpendicular to a main scanning direction and a side in said main scanning direction.

29. The image forming apparatus according to claim 27, further comprising:

an image recording time control unit which controls an image recording time based on an output of said parameter setting unit.

30. An image forming apparatus comprising:

an exposure machine for recording an image by scanning a photosensitive material, which is supported by a photosensitive material supporting unit, with a light beam irradiated from a light source, wherein the light beam has a sectional beam diameter that is substantially fixed at a certain power level even if defocus occurs, wherein the sectional beam diameter expands below said certain power level in accordance with the defocus, wherein said exposure machine is configured to adjust a power level of said light source such that said certain power level with which said sectional beam diameter is substantially fixed coincides with a threshold level for said photosensitive material to blacken, and wherein said exposure machine scans and exposures said photosensitive material at said power level of said light source such that a recording line width or a recording dot size, which is determined depending upon said threshold value for said photosensitive material to blacken, is substantially fixed even if the defocus occurs; and a development processing machine for subjecting an exposed photosensitive material to development processing, said image forming apparatus further comprising:
acquiring unit for acquiring at least one of a measurement result of a density or mesh % of a given sample, which is exposed by said exposure machine and subjected to the development processing by said development processing machine, and characteristics of exposure in said exposure machine and the development processing in said development processing machine; and
a control unit for at least one of exposure conditions in said exposure machine and development processing conditions in said development processing machine based on information acquired by said acquiring unit.

31. The image forming apparatus according to claim 30, wherein the exposure machine comprises a detecting unit which detects at least a part of an edge part of an image signal to be recorded.

32. The image forming apparatus according to claim 30, wherein said control unit controls at least one of: said exposure power of the light beam at said edge part at exposure of said photosensitive material; said exposure power of the light beam at said non-edge part; a length and/or a width of said edge part; an image recording time; a development time or a conveyance speed of said photosensitive material; electric conductivity/pH/liquid concentration of a processing liquid; an elapsed time or a processing amount of said photosensitive material after preparing a new processing liquid; and a processing liquid temperature.

33. The image forming apparatus according to claim 30, wherein the control unit controls development processing conditions in said development processing machine based on information acquired by said acquiring unit.

* * * * *